United States Patent
Koenig et al.

(10) Patent No.: US 6,965,818 B2
(45) Date of Patent: Nov. 15, 2005

(54) MOBILE ENERGY MANAGEMENT SYSTEM

(75) Inventors: David J Koenig, Wyoming, MN (US); Paul H. Plahn, Plymouth, MN (US); Dan G. Priem, Brooklyn Center, MN (US); Keith L. Lovegren, Fridley, MN (US); Brian G. Haupt, Oak Park Heights, MN (US)

(73) Assignee: Onan Corporation, Minneapolis, MN (US)

( * ) Notice: Subject to any disclaimer, the term of this patent is extended or adjusted under 35 U.S.C. 154(b) by 42 days.

(21) Appl. No.: 09/996,076

(22) Filed: Nov. 28, 2001

(65) Prior Publication Data

US 2003/0105567 A1 Jun. 5, 2003

(51) Int. Cl.[7] .................. H01M 10/46; H02J 3/14; H02H 3/24
(52) U.S. Cl. ................ 701/36; 363/35; 322/28
(58) Field of Search ................ 701/36; 363/35, 363/41, 17, 55, 98, 56.02; 320/101; 436/134, 167; 322/19, 28, 36, 45; 361/84, 90, 91.3, 79, 92; 307/38, 39, 43, 131, 130, 140, 9.1; 323/241, 320, 322

(56) References Cited

U.S. PATENT DOCUMENTS

| | | | | |
|---|---|---|---|---|
| 4,617,472 A | * | 10/1986 | Slavik | 307/10 R |
| 4,634,887 A | * | 1/1987 | Balch et al. | 290/3 |
| 5,555,483 A | * | 9/1996 | Pressman et al. | 361/90 |
| 5,583,413 A | * | 12/1996 | Proctor et al. | 320/134 |
| 5,737,168 A | * | 4/1998 | Baker | 361/90 |
| 6,055,163 A | * | 4/2000 | Wagner et al. | 363/37 |
| 6,175,217 B1 | * | 1/2001 | Da Ponte et al. | 322/19 |
| 6,404,655 B1 | * | 6/2002 | Welches | 363/41 |
| 6,429,019 B1 | * | 8/2002 | Goldstein et al. | 436/134 |
| 6,504,339 B2 | * | 1/2003 | Parks et al. | 320/101 |

* cited by examiner

Primary Examiner—Thomas G. Black
Assistant Examiner—Dalena Tran
(74) Attorney, Agent, or Firm—Schwegman, Lundberg, Woessner & Kluth, P.A.

(57) ABSTRACT

A recreational vehicle includes a chassis having a living space, an electrical system for providing electrical power to the living space, an air conditioner for cooling the living space, a heater for heating the living space, and a plurality of appliances within the living space attached to the electrical system. The recreational vehicle also includes an engine for moving the recreational vehicle, a motor generator for supplying power to the recreational vehicle, a connector for connecting the electrical system of the recreational vehicle to an external power source, and a local area network system electrically connected to the air conditioner, the heater, the plurality of appliances, and the motor generator. The local area network manages the power provided to the to the electrical appliances. A display positioned within the living space shows data related to the air conditioner, the heater, the plurality of appliances, the motor generator and the engine.

13 Claims, 15 Drawing Sheets

MOBILE ENERGY MANAGEMENT SYSTEM

FIELD OF THE INVENTION

The present invention is directed to a control system for use in a vehicle, which system provides monitoring and automatic control of major, electrically powered appliances, such as an air conditioner, motor generator, microwave or a heater.

BACKGROUND OF THE INVENTION

Vehicles such as large motor homes and yachts and the like are characterized by a unique set of appliance control problems. Large motor homes and yachts typically are equipped with one or more motor generator sets. When the large motor homes or yachts are stopped at a camp site or moored in a slip, many times a remote source of electrical power is available. When such recreational vehicles are connected to a remote source of electrical power, severe constraints are typically placed on the current that can be drawn from the remote source. As used herein, the term "shore power" will be used to designate such a remote source of electrical power for a recreational vehicle, whether land or sea based. Typically shore power is available as either a 15 amp source, a 20 amp source, a 30 amp source or a 50 amp source.

This current constraint can have dramatic results. For example, if a recreational vehicle is connected to a 20 amp source of electrical power, and the recreational vehicle includes a 15 amp air conditioner, the simultaneous use of a microwave oven or a hair dryer with the air conditioner may well exceed the available current capacity of the remote source, thereby causing circuit breakers to trip or fuses to blow. The replacing of blown fuses or the resetting of tripped circuit breakers can represent a considerable inconvenience to a user of a recreational vehicle in such circumstances.

Another related problem is related to the fact that a variety of recreational vehicles include two air conditioning units or two heating units. When the recreational vehicle is relying on shore power, it may not be feasible to run both air conditioners or both heaters simultaneously because of the power limitations of the shore power connection. For this reason, it has been customary to operate a single one of the two air conditioners from shore power and to leave the other off. This approach can represent a severe inconvenience in a situation where one air conditioner cools a first portion of the recreational vehicle, and the other air conditioner cools a second portion of the recreational vehicle. If only one conditioner is allowed to run, some portion of the recreational vehicle may not be cooled adequately. Furthermore, the approach of manually activating both of the air conditioners or heaters in alternating sequence requires considerable attention by the user.

In addition to being hooked to shore power, either at an RV park or in a slip at a harbor, there are generally two other scenarios where the sources of power must be managed. Dry camping is camping without an electrical hookup or source of power. In this instance, power is provided by on-board batteries and/or on board motor generator set. Power may also be demanded while a coach is underway. For example, a passenger of a yacht or RV may want to use air conditioners or other appliances while enroute from place to place. In this instance, power is generally provided by a motor generator.

Problems relate to determining if the motor generator sets can be used and when to enable the motor generator sets to provide a sufficient level of power for a given load. One condition that must also be avoided is running an air conditioner on less than rated voltage since this can damage the air conditioner. Still another problem is not to use motor generator sets during certain times. Motor generator sets are noisy and many RV parks and slips do not allow operation during night time hours. Thus, the operation of motor generator sets may have other limitations or constraints placed on them that need to be considered.

Still another problem is monitoring all the power systems as the various sources of power and loads are managed. The monitoring must be done so that the operator can tell what is happening in terms of power management. It would be advantageous if a graphical user interface could be used to monitor systems within the recreational vehicle. It would also be advantageous if the monitoring system could reflect very precisely various conditions of various power supplies and devices associated with the recreational vehicle. For example, it would be advantageous if the amount of power available from a DC battery source could be closely monitored.

Yet another problem is that most systems require manual adjustment of several aspects of a power system. For example, when hooking up to "shore power" there are several possible power levels. Currently, the owner operator must manually designate the available power level. In addition, when a converter is used to convert AC to DC power, the maximum charge level of the battery must be manually adjusted.

It would also be advantageous to have certain desired conditions noted and relayed to the owner/operator of the recreational vehicle. For example, if the air conditioning unit in a recreational vehicle is turned off during the day due to a failure of the unit or because too much power is required to run the unit, it would be advantageous to inform the owner/operator if the cabin temperature exceeded a desired threshold level. It would be advantageous if a known link, such as a cellular phone or pager, could be provided with an alert to such conditions. Still another problem is diagnosing problems associated with power sources and appliances and logging these problems. Still another problem is that when a problem does present itself, the priority of the problem is not set forth. Another problem stems from the fact that if a problem is found, there is no way to find a facility to fix a problem or a way to determine how close such a repair facility might be.

Yet another problem is that present power control systems are distributed and not integral. In other words, if there is a problem with motor genset and a heating unit, the repair person must find both the problems separately. In current recreational vehicles, there is not one place where the problems are logged and can be found so the repair person must deal with a variety of interfaces to get logged faults or diagnostic error codes from engines used as the primary mover of the recreational vehicle and other engines used to power a motor generator set and other vehicle and coach systems (CO level detector).

Thus, there are problems with current power systems. What is needed is a an improved power management system that provides an integrated solution and manages the various appliances and which provides a graphical user interface which is user friendly and which repair people can access to get diagnostic codes for various appliances in the recreational vehicle.

SUMMARY OF THE INVENTION

A recreational vehicle includes a chassis which includes a living space, an electrical system for providing electrical power to the living space, an air conditioner for cooling the living space, a heater for heating the living space, and a plurality of appliances within the living space attached to the electrical system. The recreational vehicle also includes an engine for moving the recreational vehicle, a motor generator for supplying power to the recreational vehicle, a connector for connecting the electrical system of the recreational vehicle to an external power source, and a local area network system electrically connected to the air conditioner, the heater, the plurality of appliances, chassis engine and the motor generator. The local area network manages the power provided to the to the air conditioner, the heater, the plurality of appliances and starts the motor generator when power through the connector is unavailable or insufficient. The recreational vehicle also includes one or more display(s) positioned within the living space. The display shows data related to the air conditioner, the heater, the plurality of appliances, the motor generator and the engine. The recreational vehicle further includes a plurality of tanks, and a plurality of level sensors for sensing the level in the plurality of tanks. The display shows the levels of the plurality of tanks. The recreational vehicle also has a microprocessor for executing commands related to the air conditioner, the heater, the plurality of appliances, the motor generator and the engine. The microprocessor commands include a diagnostic test for the various components under control of the control system. The display is used to show the results of the diagnostic test. The microprocessor commands include fetching error codes stored in memory associated with the motor generator and the chassis drive engine.

In some embodiments, the coach may not have a display. The coach will generally include the integrated power management system and integrated diagnostic system. The system without the display generally will have an interface adapted to hookup a display.

Customer service providers can hook up a display or computer system and down load diagnostics or review other relevant outputs so that the coach (such as a yacht, boat, or RV) and its systems may be adequately serviced. A recreational vehicle includes a chassis having a living space, a plurality of devices associated with the recreational vehicle, and a display positioned within the living space for displaying information related to the plurality of devices. The display capable of displaying an indication of the level within the tank, an indication of the load associated with one of the plurality of devices or with the plurality of devices, an indication of the electrical power available, engine information, and inside temperature and outside temperature.

A power system for a recreational vehicle includes a connector adapted for receiving electrical current from a source of shore power. The control system includes a circuit for automatically determining the level of shore power input to the recreational vehicle, and a device for setting an electrical system to use the appropriate amount of shore power when it cannot be automatically determined. The control system determines the shore power by detecting a phase difference between at least two phases of the shore power. If the phase is 180°, the shore power is 240 volt, which is normally associated with 50 amp service. If the phase is 0°, the shore power is 120 volt, which is normally associated with 15, 20 or 30 amp service.

In addition, a control system for a plurality of devices in a recreational vehicle includes a network having a first node associated with a first device of the plurality of devices and a second node associated with a second device of the plurality of devices. The control system also includes a microprocessor for running a set of commands to control the first device and the second device. The control system further includes memory accessible by the microprocessor for storing data associated with the first device and the second device.

One of the first and second nodes is a load control node for controlling loads associated with the recreational vehicle. The load control node can also monitor power demand and, more specifically, can monitor demand from the first device and the second device. The load control is capable of disabling one of the first device or the second device when the power demand exceeds a level of available power. The control system is capable acting through the control node of the control system to enable one of the first device or the second device when the power demand is less than the level of available power. The load control node can also monitor demand from the first device and the second device and disable one of the first device or the second device in anticipation of a condition when the power demand will exceed a level of available power. Disabling one of the first device or the second device is based on a prioritization in anticipation of a condition when the power demand exceeds a level of available power. Re-enabling the loads is done on a reverse of the prioritization.

The control system can also control a first source of power and a second source of power so that the appropriate amount of power is available for various devices within or associated with the coach. The coach generally has at least a first device and second device that supply power. The first source of power and the second source of power are associated with the load control node. The load control node monitors demand from the first device and the second device and can enable the second source of power in anticipation of a condition when the power demand exceeds a level of available power from the first source of power. The second source of power may be a variety of devices such as a battery, a fuel cell, or a motor generator set. When the second source of power is a battery, the microprocessor is acting under a set of instructions to monitor the battery charge level and control the charging and discharging of the battery. The set of instructions for the microprocessor may include a schedule of times during which the motor generator can be enabled. In other words, there may be times when a motor generator set is too noisy and may disturb others, for example, during sleeping hours in a marina or RV park.

Generally speaking, the first source of power used is the shore power, the second source of power used is motor generator power, and the third source of power used is the battery. This changes in systems that substitute a fuel cell for the motor generator. Also another energy storage device such as a capacitor bank or combination battery and capacitor bank may be substituted for or supplement a battery. There may also be other instances where this order may not necessarily be followed. The invention manages the order given various parameters and conditions.

The control system for a plurality of devices in a recreational vehicle can include a master node, and a display attached to the master node. The display is capable of displaying information from the first and second devices. The control system also includes a tank level node adapted to monitor the level of at least one tank associated with the recreational vehicle. The control system further includes an engine node for receiving information from the engine of the recreational vehicle. The information received from the engine includes fault codes associated with the engine. Yet another node associated with the control system is a transfer switch node for receiving information from the first and second devices of the recreational vehicle. The information from the first and second devices includes voltages and currents associated with the first and second devices. The information received from the transfer switch node includes battery voltage from a battery associated with the recreational vehicle as well as AC line current and voltage data.

One of the devices of the plurality of devices may include air conditioning or heating equipment. The control system may further include a temperature sensor, and a modem. In response to a temperature in the recreational vehicle being beyond a threshold value, the control system dials a predetermined number. For example, if a recreational vehicle has a coach which gets too hot and there is not enough power to enable an air conditioner, the control system may be programmed to dial the cell phone number of the owner. The control system may also include a carbon monoxide sensor. The control system will disable a motor generator in response to a carbon monoxide level in the recreational vehicle being above a threshold value.

The control system for a plurality of devices in a recreational vehicle includes memory accessible by the microprocessor. The control system stores fault codes or diagnostic data associated with the first device and the second device in the memory.

The control system can control various aspects of the entire system. The control system may also control a global positioning system ("GPS"), various databases, and connections to the Internet, such as to relevant web pages. For example, when a serviceable item arises, the controller checks databases for service centers having the capability to handle the problem and can check for availability of an appointment at the various service centers.

Advantageously, the present invention provides a control system which is integral so that a repairman or user does not have to go to each separate device to determine if there is a problem. In addition, a main computer gathers data from each of the nodes and electrical devices associated therewith so that decisions can be made with respect to one or more devices attached to a network. The main computer or microprocessor also displays status of the devices as well as decisions needed to be made by the user. For example, quiet times associated with a campground or marina may have to be input so that the main computer or microprocessor associated with recreational vehicle can determine when on board motor generators can be used. The main computer also stores diagnostic codes for use by repair persons and can be used to store locations of service dealers, dumping stations, or other needed service providers for a recreational vehicle. The main computer or microprocessor can also conduct power management by determining the amount of shore power, monitoring the shore power as well as the current draw from the loads associated with the recreational vehicle. The display is user friendly and may include a radio link so that information may be accessed exterior to the living areas of the coach or recreational vehicle.

BRIEF DESCRIPTION OF THE DRAWINGS

The invention described herein will be further characterized with reference to the drawings, wherein.

DETAILED DESCRIPTION OF THE EMBODIMENTS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1A:
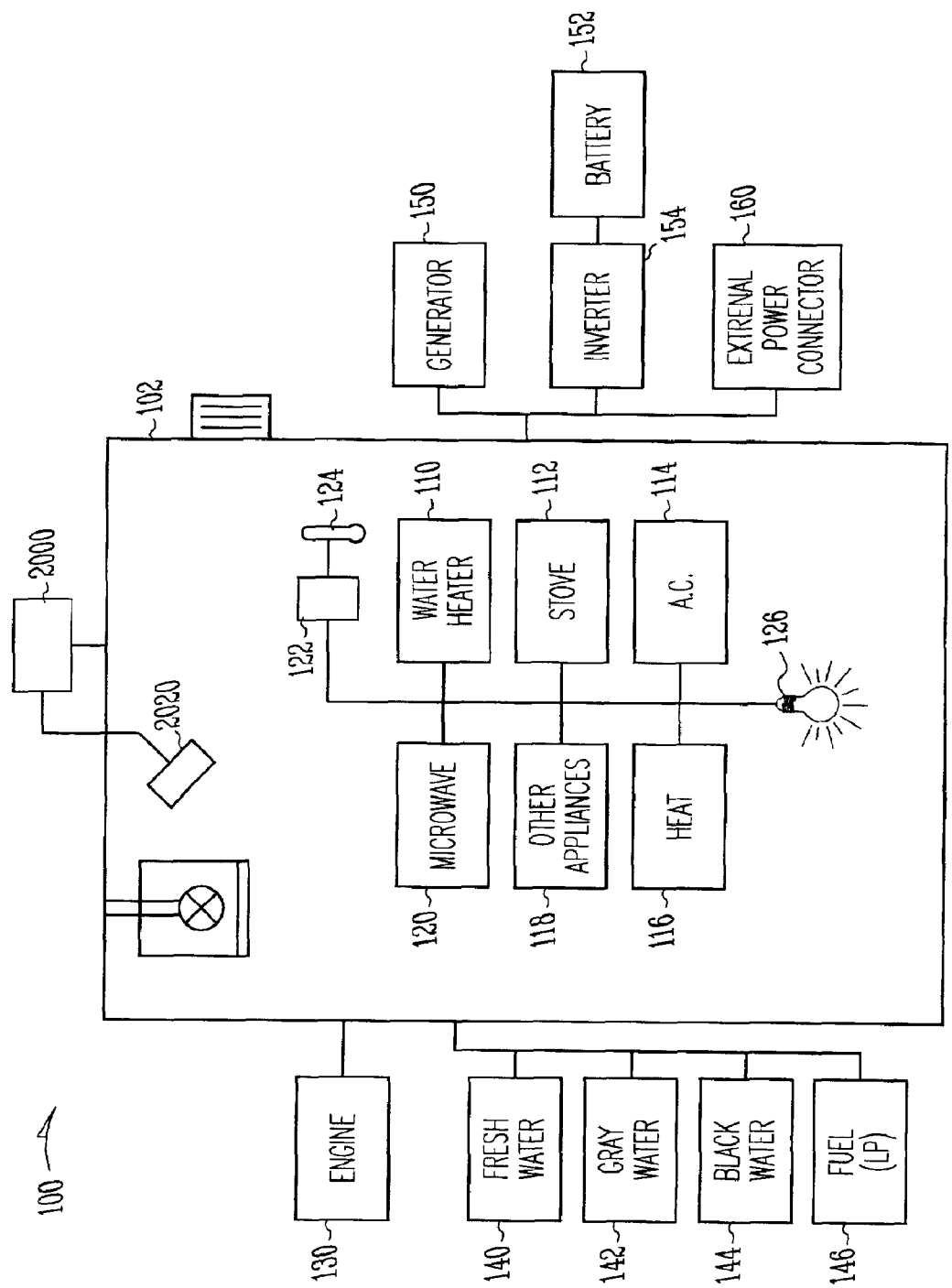
FIG. 1A is a schematic view of a recreational vehicle using an embodiment of the invention.

FIG. 1A is a schematic view of a recreational vehicle or coach 100 which uses an embodiment of this invention. As shown in FIG. 1, coach or RV 100 includes an interior living space 102. The interior living space 102 includes a water heater 110, a stove 112, an air conditioning unit 114, a heater 116, a microwave 120, and other appliances 118. Lights or a lighting system 126 are also within the living space 102 of the coach or RV 100. The coach or RV also includes a carbon monoxide detector 122 and a temperature sensor 124. As shown in FIG. 1, these particular appliances and sensors are located within the interior living space 102 of the coach or recreational vehicle 100. Also located within the interior space 102 of the coach or recreational vehicle 100 is a display 2020 which is viewable by the user of the coach or recreational vehicle 100. It should be noted that a recreational vehicle has a rather broad meaning in that it could be any type of coach, bus, boat, or limousine.

Figure 4:
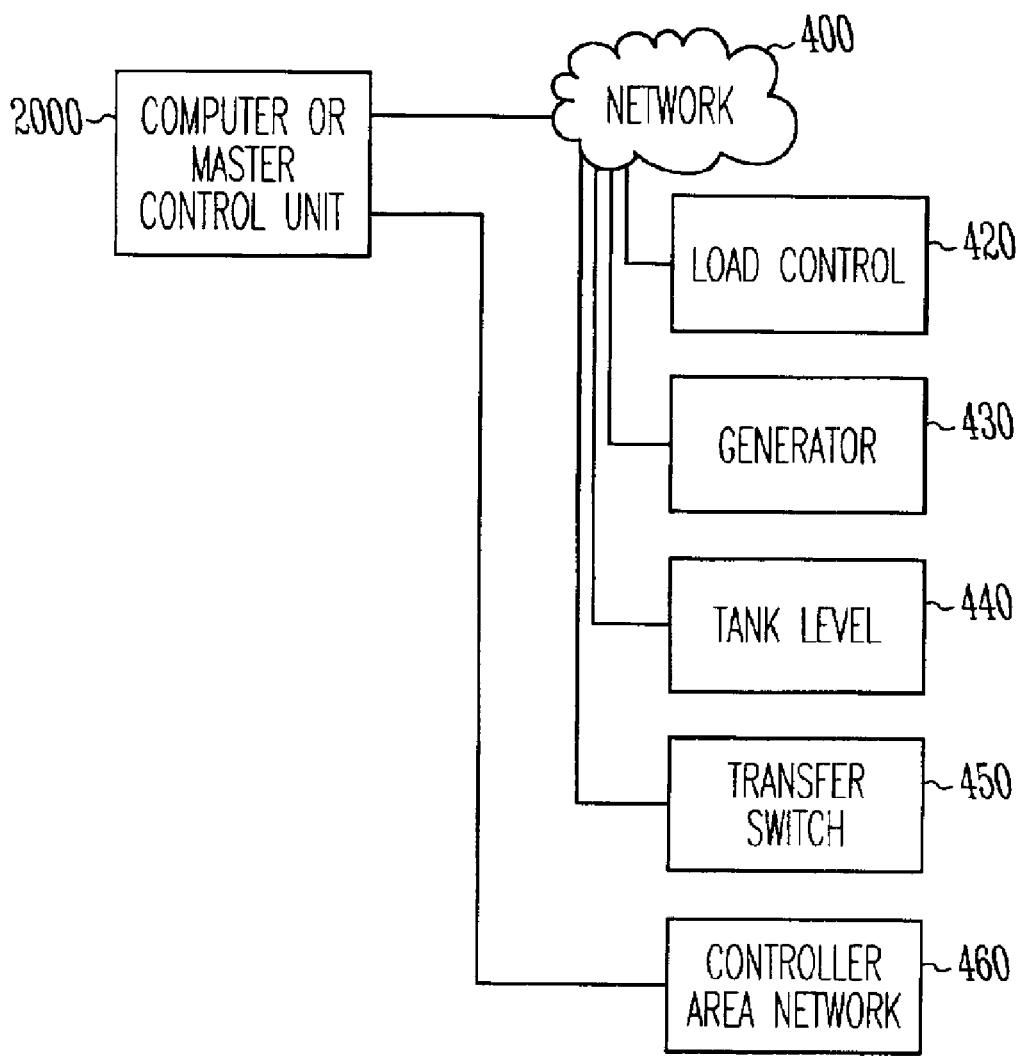
FIG. 4 is a diagrammatic view of a network used as part of the control of the various devices associated with a coach or recreational vehicle in accordance with one embodiment of the invention.

The recreational vehicle or coach also has certain devices which are exterior or outside of the living space 102. Although these are shown outside the footprint of the living space 102 in FIG. 1, it should be noted that they are incorporated within the coach and are generally not visible to the user of the coach. However, these particular devices are accessible for service reasons. The recreational vehicle or coach 100 includes an engine 130 which is used to move the recreational vehicle 100. The engine 130 may be a single engine in the case of a land vehicle, or may be multiple engines in a large yacht. The engine 130 is typically outside the living space 102 and, therefore, as shown in FIG. 1, the engine is positioned outside the living space 102 of the recreational vehicle 100. Recreational vehicles also have a number of tanks including a freshwater tank 140, a gray water tank 142, a black water tank 144, and an LP tank 146. Recreational vehicles also include a fuel tank (not shown). Also exterior of the living space 102 of the recreational vehicle or coach 100 is a motor generator 150, an inverter 154 and a battery 152. The inverter 154 generally transforms the direct current of the battery 152 to alternating current within the coach 100. Generally, a coach or recreational vehicle will include a battery or set of batteries 152. It should be noted that both the battery 152 and the motor generator 150 may be used in combination or all batteries can be used or only the generator 150 may be used. A thermometer external to the coach may also be monitored from within the coach. Also, outside the living space is an external power connector 160. An external power connector 160 is used to connect to a source of power outside the coach or recreational vehicle 100. The external power connector is said to connect to shore power. Each of the items discussed above can be termed as devices. In other words, a coach or recreational vehicle 100 includes devices which are positioned interior of the living space of the coach or recreational vehicle and other devices which are exterior to the living space 102 of the recreational vehicle 100. In this particular invention, many of the devices discussed above are all attached to a computer network via a particular node in the network. A computer 2000 is also attached to the network. The computer 2000 polls the devices attached thereto for information so that decisions can be made for the various devices attached to the network. The computer may be a personal computer or a micro-controller chip. Among the decisions the computer 2000 or microprocessor makes is the order in which devices supplying power will be used. Shore power which enters the system through external connector 160 is generally used first when available. If shore power is inadequate or unavailable, then the motor generator 150 is used. Finally, the battery 152 is used to supply power. The network is shown in FIG. 4. The details of the network will be discussed in relation to one or more of the figures that follow.

Figure 1B:
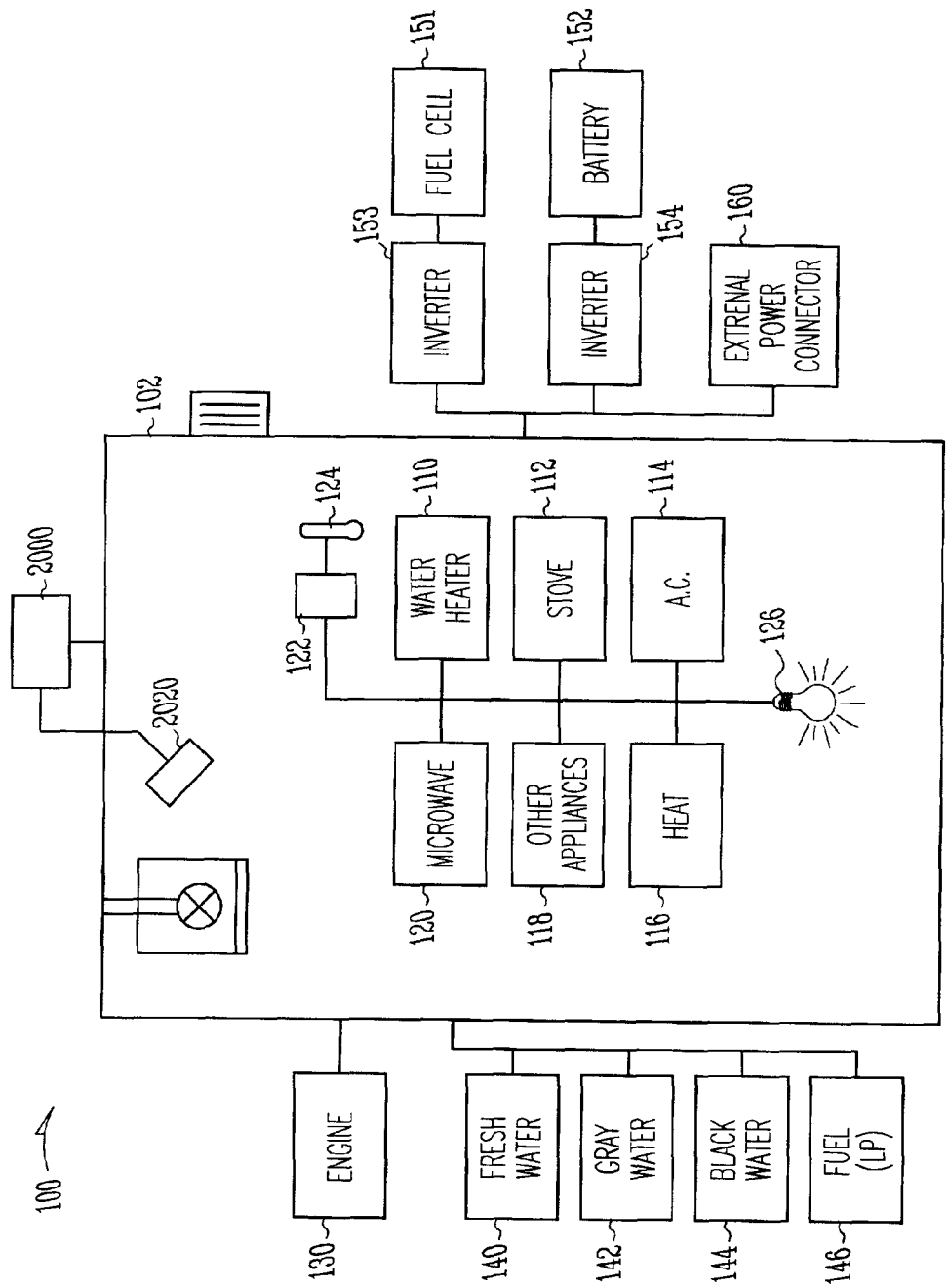
FIG. 1B is a schematic view of a recreational vehicle using an embodiment of the invention.

FIG. 1B is another schematic view of a recreational vehicle or coach 100 that uses an embodiment of this invention. The elements of FIG. 1B are substantially the same as the elements of FIG. 1A. Rather than repeat the various different elements, the difference between FIG. 1B and FIG. 1A will be discussed. The main difference in FIG. 1B is that it includes a fuel cell 151. The fuel cell 151 and inverter 153 replace the motor generator 150 of FIG. 1A. The order in which devices supplying power will be used also changed. Shore power which enters the system through external connector 160 is generally used first when available. If shore power is inadequate or unavailable, then the fuel cell 151 and inverter 153 are used. Finally, the battery 152 and inverter 154 are used to supply power.

Figure 2:
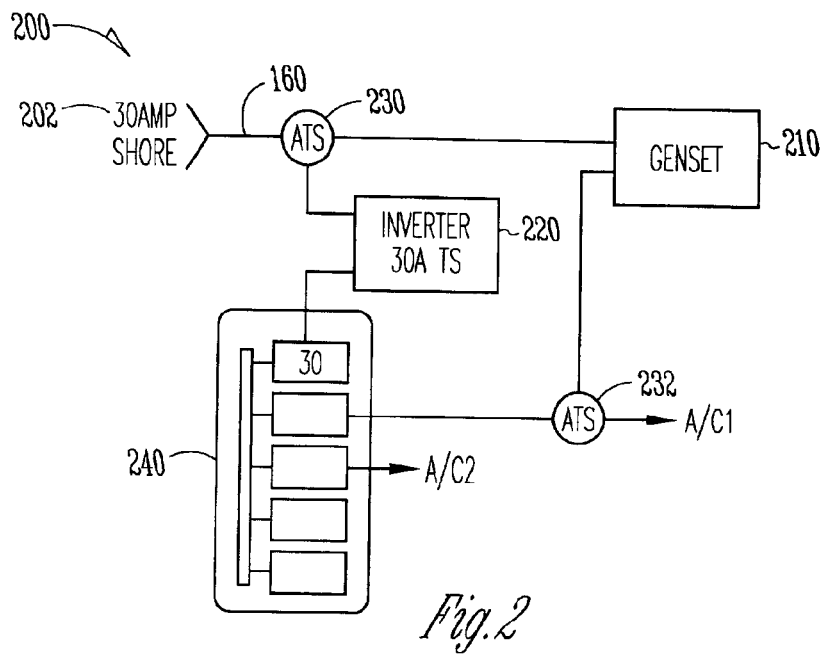
FIG. 2 is a diagrammatic view of a first recreational vehicle or coach AC power configuration in accordance with one embodiment of the present invention.

FIG. 2 is a diagrammatic view of a first recreational vehicle or coach 100 configured in accordance with one embodiment of the present invention. It should be noted that this particular configuration 200 is for a recreational vehicle ("RV") with a 30 amperes main distribution breaker. Shore power is designated by the reference numeral 202 for the configuration 200 shown. It should be noted that shore power generally is available as 15 amp service, 20 amp service, 30 amp service, or 50 amp service. 15, 20 and 30 amp service are generally single phase power. 50 amp service is generally two phase power. The configuration includes the devices which supply power in the recreational vehicle 100. The configuration includes a motor generator set 210 and an inverter 220. The configuration also includes a first automatic transfer switch 230 and a second automatic transfer switch 232. Power is provided to an electrical panel, such as a circuit breaker or fuse box 240 where it is distributed to the various devices associated with the recreational vehicle or coach 100. The power is provided to the fuse box or control panel 240 either directly from the shore power 202 or directly from the genset 210 or directly from the inverter 220. It should be noted that the inverter 220 is used to convert DC or direct current power to AC power. The inverter 220 converts direct current type power from a DC source 152 into alternating or AC current. The automatic transfer switches 232 and 230 are controlled to manage the power provided to the control panel 240. In the event that shore power 202 or inverter power is insufficient to meet the load requirements of the devices being run from the control panel 240, the genset 210 may be brought online to increase the amount of power delivered to the control panel 240.

It should be noted that the motor generator sets 210 generally run off of a separate "noisy" engine. Because of the noise, many campgrounds or marinas set forth limitations as to when a motor generator 210 can be used. Most particularly, a motor generator set 210 cannot be used during sleeping hours. Of course, these rules vary depending upon the locality of the marina or other place where a recreational vehicle may be stationed. It should be noted in FIG. 2 that the shore power 202 is single phase, as represented by one line between the shore power 202 and the automatic transfer switch 230. Even though single phase power is shown or discussed in FIG. 2, it should be noted that the same principles apply to two phase or three phase sources of power.

Figure 3:
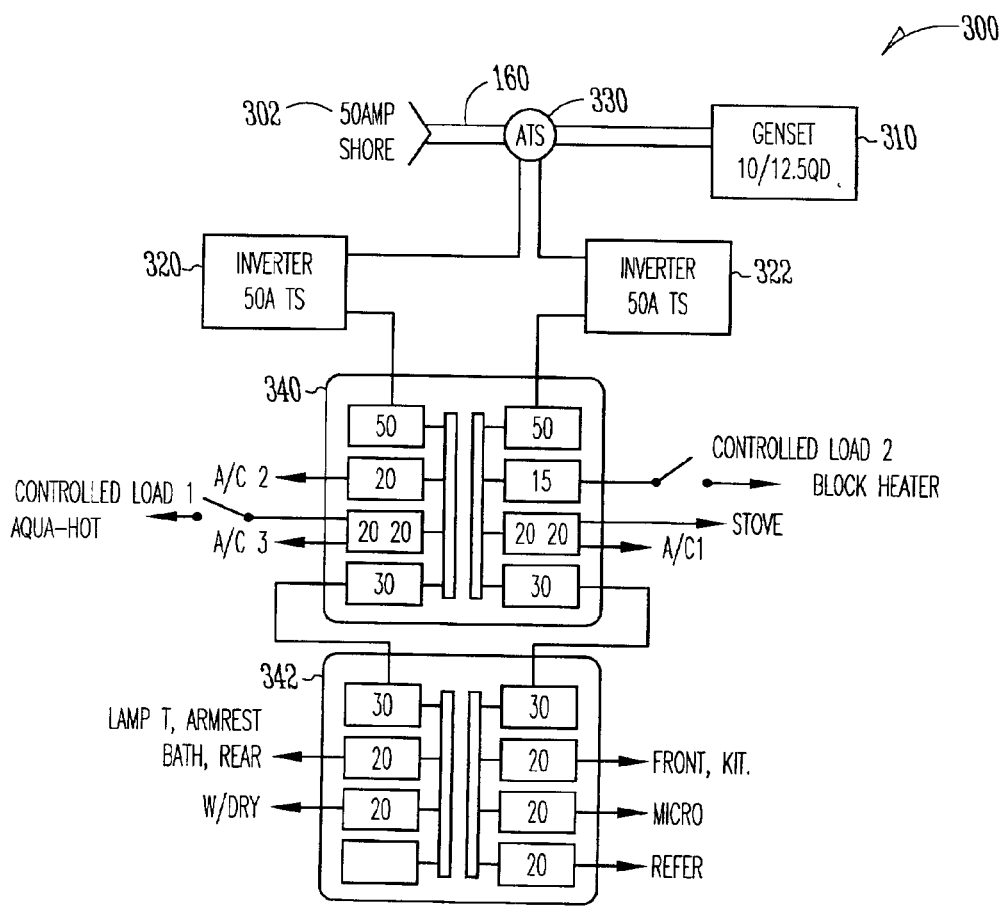
FIG. 3 is a diagrammatic view of a second recreational vehicle or coach AC power configuration in accordance with one embodiment of the present invention.

FIG. 3 is a diagrammatic view of a second configuration 300 for the instance when a coach or recreational vehicle 100 is attached to two-phase, 50 amp shore power 302. The configuration includes a motor generator set 310 which includes one or more motor generator and a first inverter 320 and a second inverter 322. Each of the inverters 320, 322 is connected to a control panel 340 which is in turn connected to a second control panel 342. The various loads or appliances are attached to the control panels 340 and 342. It should be noted that the various devices using power shown in FIG. 1 is not an exhaustive list. For example, as shown in FIG. 3, a block heater for the engine or engines 130 is shown. The block heater may also be used for the engines associated with the motor generator or motor generators 150. Additional loads include a refrigerator and a washer/dryer and, of course, within the interior living space 102 of a coach 100 there is also an electrical system so that various appliances may be plugged into wall sockets. In other words, various coaches will have various configurations of appliances and these all can be swept under the heading of other appliances 118, as shown in FIG. 1. The configuration 300 also includes an automatic transfer switch 330 which is used to supply the control panel with any combination of shore power 302, power from the motor generator set 310 and power from the inverters 320 and 322. Changes in the power supplies can be made when needed or in anticipation for the need of more or lesser amounts of power. As mentioned previously, the inverters 320 and 322 convert DC power from either a battery or batteries and/or a fuel cell or fuel cells to AC power. Generally, it should be noted that when the inverters 320 and 322 are connected to batteries, very small or short duration loads are attached since large loads will deplete the batteries rather quickly.

FIG. 4 is a diagrammatic view of a network 400 used to control and monitor the various devices associated with the coach or recreational vehicle in accordance with the invention. The network 400 allows information to be shared amongst a number of nodes. The network 400 can be any kind of network such as Ethernet 10-based T or 100-based T or a token ring or gigabyte-type network, or even a wireless network. In this particular embodiment, the network is a LONWorks network, which includes individual node boards connected together with four conductor network cable. There are six types of node boards which correspond to the nodes set up as part of the network 400. The network 400 includes a master node 410, a load control node 420, a motor generator node 430, a tank level node 440, a transfer switch node 450, and a controller area network node 460. A main control unit ("MCU") or computer 2000 runs the network and makes decisions based upon the information collected from the various nodes and specifically from the various devices equipped with the various type of node boards to connect or become part of the nodes discussed above.

Master node 410 provides a LONWorks interface for the display 2020. The load control node provides load control and demand monitoring for large loads in the coach or recreational vehicle 100. The large loads include the air conditioner or air conditioners 114, the hot water heater 110, the washer and dryer, as well as the block heater. Of course, this listing of large nodes is not exhaustive, and other large nodes may be added to the load control node depending upon the specific configuration of the coach or recreational vehicle 100. The motor generator node 430 starts, stops and communicates with the motor generators 150, 210, 310. The motor generators provide information to the network including motor generator voltage, frequency, rpm, engine temperature, operational hours and diagnostics. Once again, this list is not exhaustive but only represents some of the potential information that the devices attached to the motor generator node may provide to the network 400. The tank level node 440 provides level monitoring for the fresh water tank 140, the gray water tank 142, the black water tank 144, and the LP gas tank 146. The transfer switch node provides the network with coach voltages and currents as well as battery voltage. In some embodiments, the voltage of a fuel cell may be substituted for the voltage of the battery, as for example, when fuel cells are used as a DC power supply rather than a battery. The transfer switch node 450 contains the network power supply and monitor the line currents and voltages at the transfer switch. The controller area network node 460 provides an interface to retrieve and display data from the engine 130. The main control unit or "MCU" collects information from the various nodes on the network and displays necessary information on the screen 2020 within the living space of the coach 102. The computer also makes load shed or motor generator start/stop decisions based on the information obtained from the network 400.

Figure 5A:
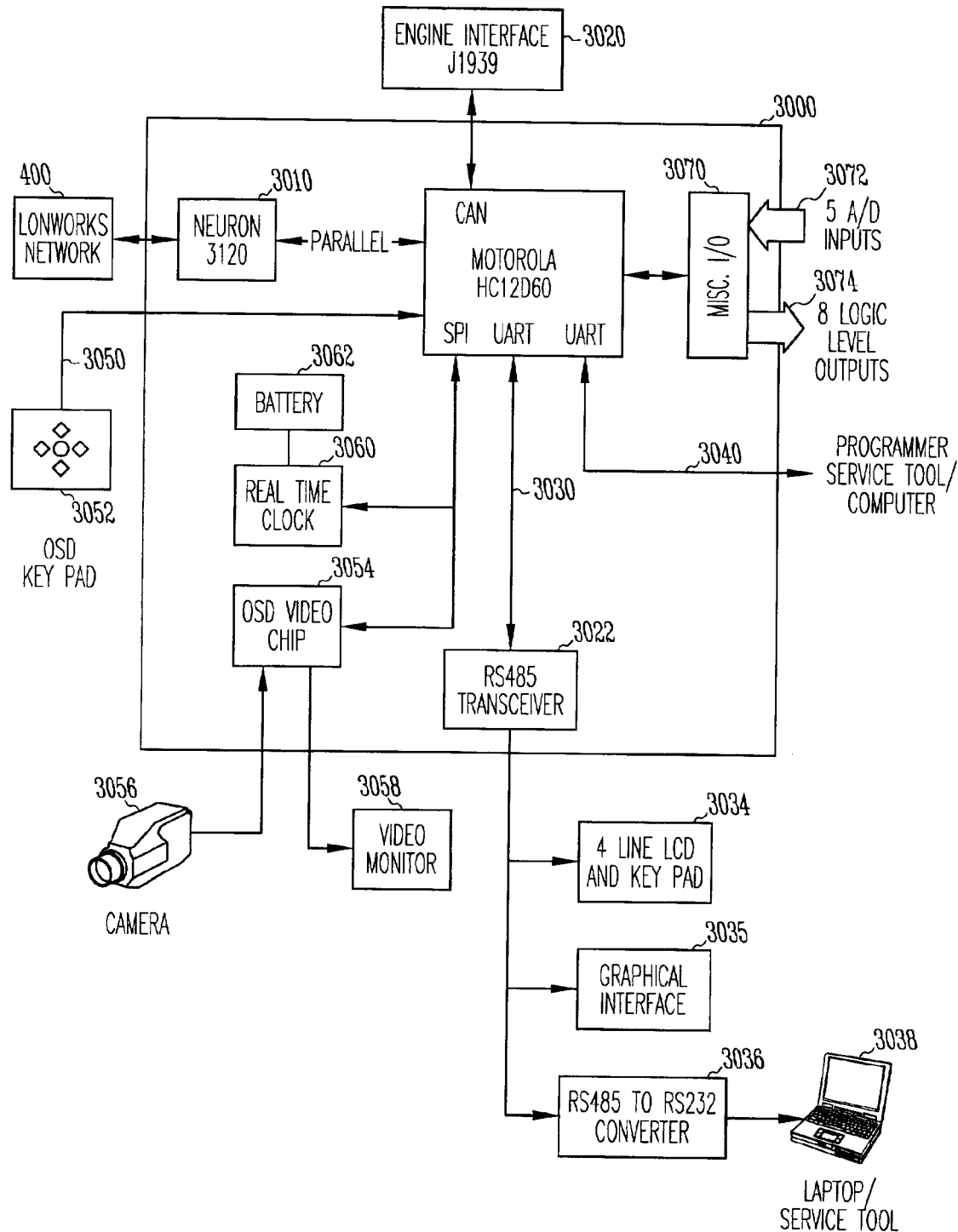
FIG. 5A is a schematic of a network using a master control unit.
Figure 5B:
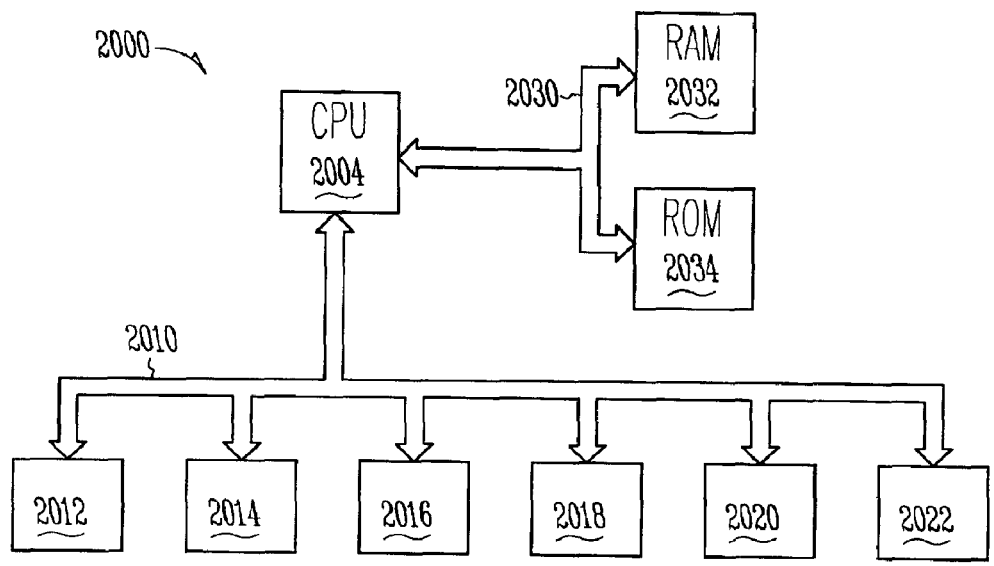
FIG. 5B is a schematic of a computer system used in the network.

FIG. 5A is a schematic view of a network with which is controlled by a main control unit 3000 the main control unit is a Motorola HC12D60 microcontroller. The main control unit 3000 is attached to the LONworks network 400 via a neuron 3120 chip, designated by reference numeral 3010. The main control unit includes an engine interface 3020 which could replace the CAN node in the network shown in FIG. 4. The main controller 3000 includes an RS485 bus 3030 which includes an RS485 transceiver 3032 capable of supporting multiple user interfaces such as a 4 line LCD and keypad 3034, a graphical interface 3035 or RS485 to RS323 converter 3036. The converter 3036 includes an RS232 port so that a laptop or other service tool type computer 3037 can be directly interfaced with the main control unit 3000. The laptop or service tool is referenced by number 3038. The main control unit also includes an RS232 port 3040. The RS232 port is a programming/user interface/service tool port. The main control unit also includes an onscreen display keypad interface 3050. Beyond screen display interface includes an onscreen display keypad 3052. Using the onscreen display keypad 3052, the user may select from various options presented on the onscreen display. Also included is an onscreen display video chip which is connected to the microcontroller through a SPI port. Beyond a screen display video chip 3054 provides onscreen display capability for a video monitor 3056 as well as an interface to the backup screen 3058. The main control unit 3000 also includes a real time clock 3060 and a battery backup 3062. Advantageously, the main control unit will not lose the time or the date when turned off since the battery 3062 prevents the real time clock from shutting off when power to the main control unit 3000 is removed. The main control unit 3000 also includes miscellaneous input/output interface with 3070 which allows 2 analog to digital inputs 3072 and 5 logic level output 3074. The logic level output 3074 can be used for tank level annunciation as well as other purposes. FIG. 5B is a schematic view of a computer system used with the network discussed above. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 may also include an input/output bus 2010 and several peripheral devices, such as 2012, 2014, 2016, 2018, 2020, and 2022 may be attached to the input output bus 2010. Peripheral devices may include hard disc drives, magneto optical drives, floppy disc drives, monitors, keyboards, modems and other such peripherals. As shown in FIG. 5, the computer system 2000 includes a display 2020 and a modem 2022. The modem 2020 is situated in the coach or in the living space of the recreational vehicle 100. The display 2020 may be any display. In this particular embodiment, the display 2020 is a LCD touch screen display. The modem 2022 may also be of any type, such as a 56K modem attached to a cellular link or an RF modem.

The computer 2000 is an information collector and decision maker for the entire recreational vehicle or coach 100. The various nodes, master node 410, load control node 420, motor generator node 430, tank level node 440, transfer switch node 450, and controller area network node 460 reports information to the computer or MCU 2000 and then the computer or MCU 2000 makes decisions on the information or displays the information on the display 2020 within the living space of the coach 102. The computer or MCU 2000 is the main diagnostic point within the coach 100. In other words, when a fault or other error signal is found in various devices connected to the network 400, the computer 2000 will log these errors in memory for retrieval at a future time.

The computer 2000 provides various monitor and control functions. The computer 2000 may control the serial communication with a service tool or external computer and serial communications with a display or displays. The computer 2000 also controls initialization of the system, the customer interface or display 2020, diagnostics, auto start disable considerations and tank level monitoring. The computer 2000 also recognizes faults within the network 400 and will disable the network and related controls when a fault is encountered so that a user may control the various appliances and devices in manual mode.

The computer 2000 continually monitors the present power source (i.e. inverter, motor generator, and shore power) and determines if there is enough power to run loads. If there is not enough power available in the system, the computer 2000 will either disable loads or create more power capacity by starting the genset 210, 310. The computer can be programmed to anticipate overload conditions or can operate to disable loads or create more power only in the presence of an overloaded condition.

The computer 2000 enables and disables loads based on the amount of power used compared with the amount of power available. The amount of power available is determined by the source. When the power used approaches the power available, the system will start disabling loads based on the priority of the load. The priority of each load is set in the system setup. The loads will be enabled again when enough power is available. All of the controlled loads are disabled when running on inverter power.

As mentioned previously, the computer 2000 is an information collector and decision maker for the entire recreational vehicle or coach 100. The computer 2000 and the local area network 400 to which the computer 2000 is connected, is used for various purposes throughout the life of the coach or recreational vehicle 100. For example, at the time of manufacture, the computer 2000 is provided with test data from various original equipment manufacturers for the devices or appliances associated or in the coach 100. For example, the original equipment manufacturer for an engine will provide software instructions for conducting an automated test of the engine. The automated test will be a final test at manufacturing to make sure that the engine installed within the coach 100 will work appropriately. Other original equipment manufacturers will provide similar tests for air conditioning units, hot water heaters, microwave ovens, electrical systems, the motor generator, the inverter, a security system (if provided) and various senders from various tanks. This list of automated tests is not exhaustive. The number of automated tests that can be loaded into the memory of the computer is only limited by the capacity of the memory. In addition if random access memory 2032 is not large enough, auxiliary memory such as a disk drive device can also be loaded with original equipment manufacturer's automated tests. The computer 2000 also is programmed to run diagnostic routines on various devices associated with the coach 1000. The diagnostic routines may be used when the coach 100 is being serviced or the diagnostic tests can be run at various times during the life of the coach. For example, a diagnostic routine may be run after a long period has elapsed between the last use of the coach 100. The diagnostic test may also be tied to mileage or also may be tied to a calendar. The computer system 2000 typically has a clock and calendar associated therewith. The diagnostic routines are typically run after the vehicle or coach 100 has been manufactured. Diagnostic routines can be run on inverters, motor generators, engines, air conditioners, water heaters, batteries, the network 400 or any appliance added to the coach 100. One use of the computer is to do load profiling on the various electrical motors used by various devices associated with the coach 100. For example, the loads for an air conditioner can be recorded over time. When the load or appliance begins to use more current than in the past, an over-current condition can be diagnosed and sent to the computer where it is stored in memory or displayed on display 2020. An over-current condition generally indicates that an appliance, such as an air conditioner or motor generator, may be about to fail or that a component of a particular device may be about to fail.

The various devices may also generate faults which are passed to the computer 2000 via the various nodes on the network 400. In this particular case, the faults are generated by the devices themselves then the computer 2000 running a diagnostic routine against the various devices. In this way, problems with the various devices will be identified as they occur. Various appliances or devices associated with the coach 100 produce faults. For example, the motor generator produces faults; the coach itself produces faults; the inverter produces faults; the engine produces faults; the tank sender produces faults. The security system can also produce a fault such as when there is a security breach. In addition, faults can be detected when the external power connector 160 of the coach 100 is connected to shore power. For example, when the AC shore power has reversed polarity, a polarity fault is generated. Other examples are when the ground or neutral are open. AC shore power is supposed to be ground fault protected and if a ground fault is sent, this also produces a fault condition. Generally the faults are stored in nonvolatile memory such as a disk drive associated with the computer system 2000. The faults which are either sent by the various devices to the computer or that result from diagnostic tests being run, are all stored within the computer and maybe accessed by a download of that particular file when the coach 100 is brought into a service or care facility. In addition, as the faults are either generated by diagnostics or are produced by the various appliances associated with the coach 100, the faults are ranked in terms of importance. Extremely important faults are displayed on the computer display 2020 placed inside the coach 100. Thus, as the driver is operating the coach 100, the display can display extremely urgent faults that may require the immediate attention of the operator. It should be noted that the display 2020 will have a main screen which will be used to display ordinary data to the operator. The faults can be superimposed upon the video display screen or they may be put in a separate pop-up window that will occur at a noncritical area of the display.

The display will display the miles, the speed, miles to empty, miles to destination, as well as the tank levels for the fuel tank for the main engine and the generator, as well as tank levels for fresh water, gray water and black water tanks 140, 142 and 144, respectively. Another fault that may be displayed or that may occur is a sensor fault. The various tanks have sensor plugs which produce a signal regarding the tank level.

The computer also stores information such as service reminders which occur at various mileages or at various times during the life of the coach 100. The computer also stores vehicle ID or appliance information such as serial numbers and model numbers. The computer also monitors the inverter interface 154 and can do load profiling and a diagnostic on the battery to determine the length of time the batteries may stay charged. Other information that the computer 2000 may store includes various website addresses, such as www.funroads.com which is a website that includes diagnostics and a locater for various service facilities.

The state of the battery is also watched. When the battery is used, it is generally drawn down and needs to be recharged by the converter 150. Over the life of the battery, the amount of time that it takes to recharge the battery as well as the level to which the battery can be charged to, is kept in a log for diagnostic purposes. If the battery recharge time becomes longer then a predetermined time, a battery fault may be produced which indicates that the battery or batteries 152 of the coach 100 may be nearing the end of life. Also, the motor generator starter motor voltage and current during cranking are stored for diagnostic purposes.

A trip log may also be stored on the computer.

When Automatic Generator Start (AGS) is on, the system can automatically start the genset when necessary to run loads or charge the batteries. Auto Gen is defaulted to off on power up and has to be manually turned on at one of many types of the user interfaces. If the genset is manually started while Auto Gen is on, the genset will turn off five minutes after genset power is not needed. If the genset is manually stopped at the screen, AUTO GEN will be turned off. The genset will also be started to charge the batteries if battery voltage is below the minimum battery voltage threshold (11.8V adj.) and the coach is not connected to shore power. If the genset 210, 310 is started due to low battery voltage it will run until charge current is less than 3 Amps AC and until genset power is not needed by any appliances, whichever is longer.

The user can set up to two quiet times per day during which the genset 210, 310 will not start automatically. If the genset is manually started while in quiet time it will be turned off.

Figure 6:
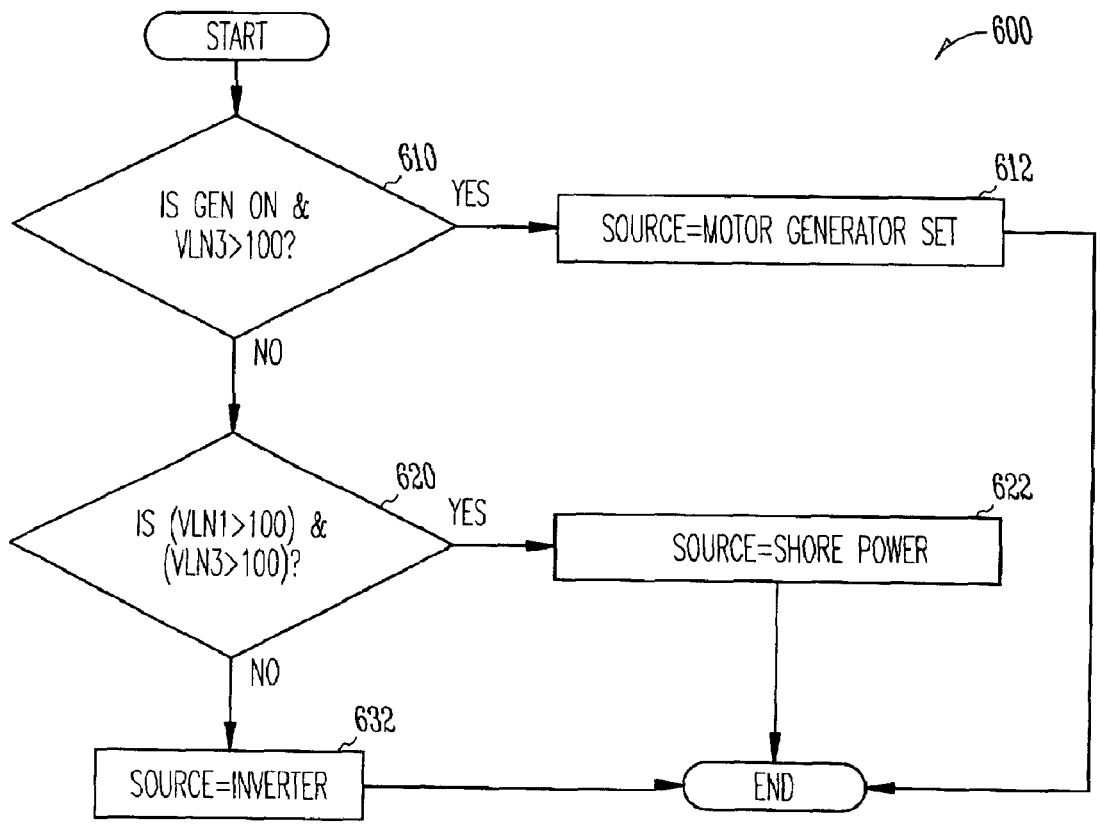
FIG. 6 is a flow diagram of determining source power.

FIG. 6 is a flow diagram 600 for determining the source of power. As seen in FIG. 2, the connection 160 between the shore power 202 and the automatic transfer switch 230 is a single line having a value designated VLN1. Looking at FIG. 3, there are two lines representing two phases of power associated with the connector 160. One of the lines is measured as VLN1, which is the same line as is in FIG. 2,. VLN3 represents power after the transfer switch 230. By looking at the various values for VLN1 and VLN3, the source of power can be determined. When VLN3 is greater than 100 volts and the motor generator set is on, the source of the power is the motor generator set, as depicted by reference numeral 612. If the condition VLN3 is not greater than 90 or the motor generator set is off, then another decision box 620 is made. If VLN1 is greater than 100 volts and VLN3 is also greater than 100 volts, then the source of power is shore power, as depicted by reference numeral 622. If VLN1 is not greater than 100 and VLN3 is not greater than 100 volts, then the source of power is the inverter, as depicted by reference numeral 632.

Figure 7:
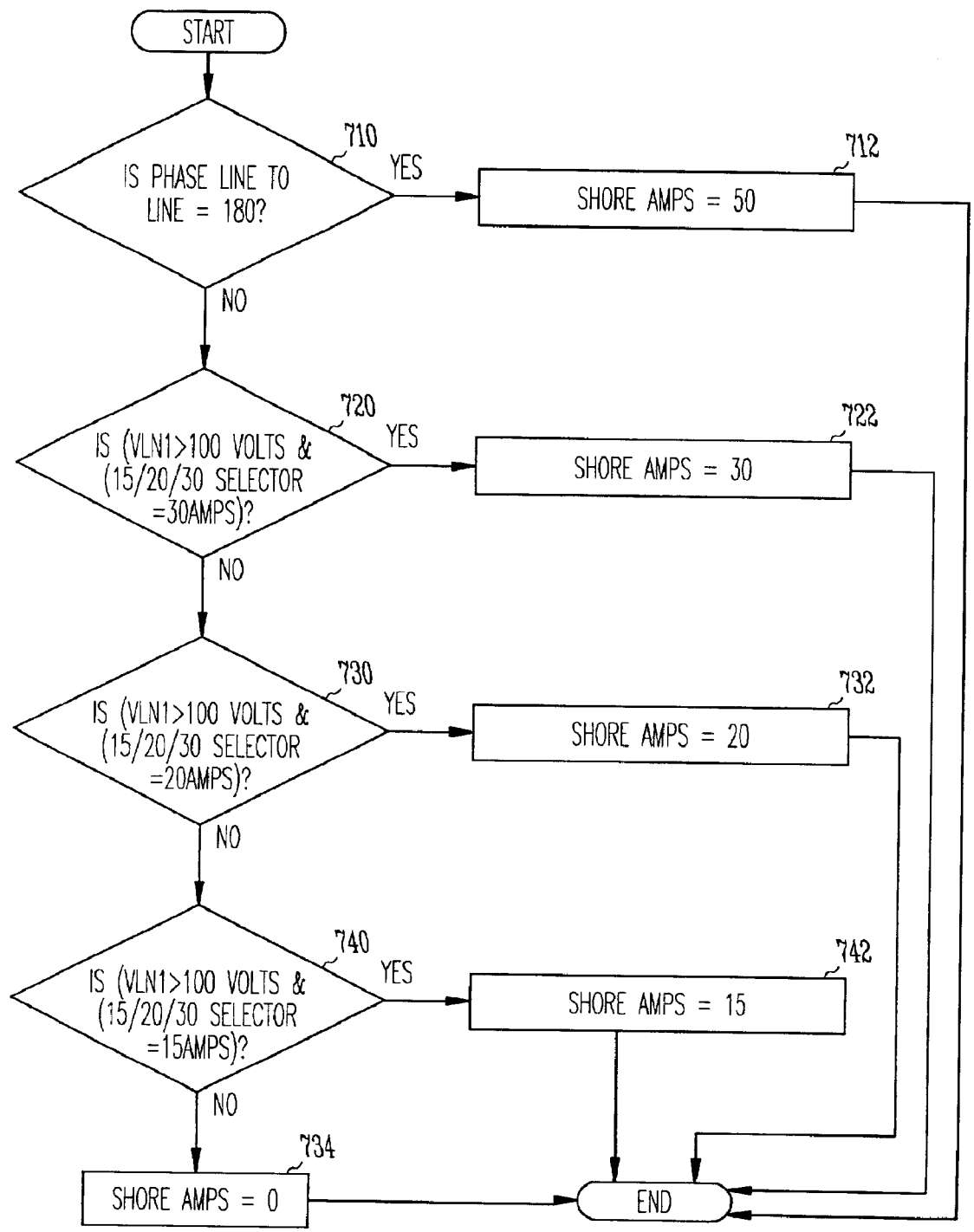
FIG. 7 is a flow diagram of determining the size of source power.

FIG. 7 is a flow diagram for determining the size of the shore power. The values of VLN1 and VLL1 are reviewed to determine the amperage of the shore power. VLL1 represents the phase angle between line 1 and line 1. First of all, if VLL1 equals 180 and VLN1 is greater than 100 volts, as depicted by decision box 710, then the shore amps equal 50 amps, as depicted by reference numeral 712. If the condition of decision box 710 is not met, basically the user of the recreational vehicle is asked to select between 15, 20 and 30 amps. However, if no selection is made, the shore amperage is determined or defaults to 30 amps or the higher current that could be available on one line or in a single phase. If VLN1 is greater than 100 volts and the 15/20/30 selector is set to 30, as depicted by decision box 720, then the shore amps equal 30 amps, as depicted by reference numeral 722. If VLN1 is greater than 100 volts and the 15/20/30 selector is set to 20, as shown by decision box 730, then the shore amps equal 20 amps, as depicted by reference numeral 732. If VLN1 is greater than 100 volts and the 15/20/30 selector is set to 15 amps, as depicted by decision box 740, then the shore amps equal 15 amps as depicted by reference numeral 742. Finally, if VLN1 is not greater than 100, then the shore amps is determined to be zero, as depicted by reference numeral 734.

The size of the motor generator set and the number of amps coming off the motor generator set is determined by measuring the voltage out of the motor generator and then determining the particular model number of the motor genset 210, 310. Depending upon the model number of the motor genset, the amperage can be either 15 amps, 20 amps, 30 amps, 40 amps, or 50 amps, which are output from the motor genset 210, 310. The output from the inverter is determined by the inverter rating in watts divided by 120. The inverter rating is set by an original equipment manufacturer. The computer 2000 is also able to perform a power consumption calculation based on the amperage out of an inverter 220 in FIG. 3, which is CT4. There are similar measurements for a first line with values CT2 representing the amperage out of the inverter 320, respectively. The difference in CT lines (CT1–CT2, CT3–CT4) is charge current. On shore or generator power, power consumption= CT1 for line 1, CT3 for line 2 on shore power. Once the calculation is made, the amount of available power can be determined by subtracting the used amps or consumed amps from the rated amps to determine the free amps available. The number of free amps available determines whether a load will be shed or whether another source of power will be added so that there will be more free amps available to keep a load enabled. Of course, if the batteries are depleted or a fuel cell is depleted, then an inverter 220, 320, 322, will not have any power available. Furthermore, if it is a quiet time, or time when a motor genset 210, 310 is not to be used, or it is a "quiet time", then the motor generator set cannot be enabled and, therefore, this source of power will not be available. Generally, the free amps are looked at to determine how much power is available or if it is over a maximum and no additional power can be made available. Certain loads will then be disabled according to a priority set by either the manufacturer, original equipment manufacturer, or the user. The amount of power measured also determines whether or not load can be enabled or a shed load can be re-enabled. There are also specific procedures for determining what to do when a low power condition is encountered. These are outlined below in the following paragraphs. It should be noted that for the different configurations shown in FIGS. 2 and 3, there are many different sets of instructions on how to proceed.

Load Enable/Disable

The computer 2000 controls loads based on their priority and whether the system has enough power available to run the load. If there is not enough power available, the computer 2000 will disable the load until there is enough power for the load to run. Loads are either controlled loads or controlled and monitored loads. A controlled load is a load that the computer 2000 can disable but does not know if there is demand. A controlled and monitored load is a load that the HMI controls and also can determine when there is demand for the load. Each load has a priority associated with it that the HMI uses to determine what load to enable or disable first. The loads with the lower priority will be disabled first. Likewise, higher priority loads will be enabled first.

1.

Types of Loads

1. There can be any selected number of load control nodes in the network controlling air conditioners or general loads. There can be any combination of A/Cs or general loads controlled by the load control nodes. An original equipment manufacturer typically has to select information to input to a load control node.

Disabling Loads

The computer 2000 or microcontroller disables loads when the amount of current being used is approaching the amount of current available by the present source of power. The computer 2000 or microcontroller will also disable multiple loads at the same time based on the amount of current used. For example, if the coach is drawing 20 amps over rated and the next two loads to be disabled draw 12 amps each, then the computer 2000 or microcontroller should turn both loads off at the same time.

The order that the loads are disabled is configuration dependent. For example, when running on 50 amp shore power (240 volt system), load shedding needs to be done for each line independently because if the system is overloaded on line 1 and the computer 2000 or microcontroller sheds a load that is running on line 2 nothing is done to reduce the load on line 1. Similarly, if a 50 amp coach is plugged into 30 amp shore power, the current on line 1 and line 2 together must not exceed 30 amps, so shedding the load on either line will help the problem of overloading. Therefore the order that the loads are disabled depends on priority as well as the source of power.

All controlled loads should be disabled when on inverter.

Enabling Loads

The order that loads are enabled also depends on priority (it is the reverse of disabling). Also, the computer or microcontroller waits for a selected amount of time after the source of power changes to allow the power to transfer through the inverter before enabling any loads. Generally, there must be a delay of at least 10 seconds between enabling loads.

Current Cushion

The current cushion provides a buffer for making load shed or genset start decisions. The computer or microcontroller tries to keep the current draw less than the rated current minus the current cushion. The current cushion shall be different for each source of power. On inverter power the genset shall be commanded to start when the current draw reaches 70% of rated or in other words it has a 30% current cushion. On shore power there should be a 20% current cushion and on genset power there shall be a 4 Amp current cushion.

Configuration Shown in FIG. 2 (Configuration 0)

In this configuration, when the genset is running, some controlled loads can be powered from the second output of the motor generator and thus gets dropped from the power calculations. When powered from the inverter, large loads are disabled because they drain the batteries too quickly.

```
if source = inverter
    Controlled loads are not allowed to run on inverter power.
    If AGS is on, the genset should be started when free_amps < inverter
        current cushion
if source = shore
    LOAD ENABLING
        There is enough power available to enable a load when
        free_amps >controlled load current + current cushion.
    LOAD DISABLING
        If the controlled loads are enabled, they should only be disabled
        if free_amps < current cushion and the lower priority loads are
        already disabled.
if source = motor generator
    LOAD ENABLING
        If the controlled loads are disabled, they can only be enabled
        again if free_amps > current cushion + controlled load current
        When the source is the motor generator, at least one of the
        controlled loads are connected directly to the second output of
        the genset (see configuration section) therefore, the HMI should
        not shed these loads when running on genset power.
        There is enough power available to enable a load when
        free_amps > load amps + current cushion.
    LOAD DISABLING
        If the controlled loads are enabled, they should only be disabled
        if free_amps < current cushion and the lower priority loads are
        already disabled.
        Disable loads if there is not demand or if free_amps < current
        cushion
```

Configuration Shown in FIG. 3 (Configuration 1)

```
        When controlling loads on configuration 1, both line 1 and
line 2 need to be taken into account because if line 1 is overloaded and
the
HMI sheds a load that is on line 2, the overload condition on line 1 is
not solved.
if source = inverter
    Controlled loads are disabled on inverter power. (except Dometic
    A/C's see section 3.5)
    If AGS is on genset should be started when free_amps < inverter
        current cushion
if source = shore and rated_amps = 50
    LOAD ENABLING
        If a controlled load on line 1 is disabled, it can be enabled again
        if free_ampsL1 > current cushion + the controlled load current
        If a controlled load on line 2 is disabled, it can be enabled again
        if free_ampsL2 > current cushion + the controlled load current
    LOAD DISABLING
        If a controlled load on line 1 is enabled it should be disabled if
        free_ampsL1 < current cushion and the lower priority loads on
        line 1 are already disabled.
        If a controlled load on line 2 is enabled it should be disabled if
        free_ampsL2 < current cushion and the lower priority loads on
        line 2 are already disabled.
if source = shore and rated_amps = 20 or 30
    LOAD ENABLING
        If a controlled load is disabled, it should be enabled again if
        free_amps > current cushion + the controlled load current and if
        the higher priority loads are already enabled
    LOAD DISABLING
        If a controlled load is enabled, it should be disabled if
        free_amps < current cushion and the lower priority loads are
        already disabled
```

-continued

```
if source = motor generator
    LOAD ENABLING
        If a controlled load on line 1 is disabled, it can be enabled again
        if free_ampsL1 > current cushion + the controlled load current
        If a controlled load on line 2 is disabled, it can be enabled again
        if free_ampsL2 > current cushion + the controlled load current
    LOAD DISABLING
        If a controlled load on line 1 is enabled it should be disabled if
        free_ampsL1 < current cushion and the lower priority loads on
        line 1 are already disabled.
        If a controlled load on line 2 is enabled it should be disabled if
        free_ampsL2 < current cushion and the lower priority loads on
        line 2 are already disabled.
```

Genset Start/Stop/Prime

The microcontroller or computer 2000 can start the genset only under two conditions:

1. The user manually pressed the start switch at the microcontroller or computer 2000

2. When AGS is on and motor generator power is needed.

The microcontroller or computer 2000 will prime the motor generator for a selected amount of time when prompted by the user at the microcontroller or computer 2000.

Automatic Generator Start (AGS)

When AGS is on, the microcontroller or computer 2000 is capable of starting the genset when necessary to run loads or charge the batteries. AGS is enabled only when the user enables it at the microcontroller or computer 2000. AGS is disabled when selected by the user at the microcontroller or computer 2000, when gen node or TS node is not communicating, when the genset was stopped and microcontroller or computer 2000 did not command it to, when motor generator fault !=0, when carbon monoxide ("CO") detector is connected to the network and is activated when genset stop is pressed at the microcontroller or computer 2000. If in quiet time, the genset is not allowed to start. If the genset is manually started during this time, the microcontroller or computer 2000 will turn it off. If the genset is already running when it goes into quiet time, the microcontroller or computer 2000 will stop it. If AGS is manually disabled while the genset is running, the genset shall continue to run.

Manual Start

The user must be able to start and stop the genset manually from the microcontroller or computer 2000 as if it were a standard on/off switch. If the user starts or stops the set when AGS is off, the microcontroller or computer 2000 will let the set run or stay off until the user commands another operation.

Stop Delay Time

When AGS is on, the microcontroller or computer 2000 will turn off the genset only if it has not been needed for 5 minutes.

Quiet Time

When the system is in quiet time, AGS is temporarily disabled. The user can set up to two quiet times per day.

Genset Starting and Stopping Procedure

The microcontroller or computer 2000 must disable all the controlled loads before turning off the genset.

Ways in which the microcontroller or computer 2000 can stop the set:
1. AGS is on and Quiet Time is entered
2. AGS is on and charging current is equal to or less than the minimum charge current (as set in the OEM setup) and genset power is not needed
3. Manual Stop is pressed Ways in which the microcontroller or computer 2000 can start the set:
1. AGS is on and not in quiet time and Free amps<cushion
2. AGS is on and not in quiet time and a load is disabled and has demand and source is inverter
3. AGS is on and not in quiet time and a load is disabled and source is<50A shore
4. If the battery voltage has been less than the minimum battery voltage (as set in the OEM setup) for 20 seconds and shore power is not available
5. Manual Start is pressed The following describes low power conditions for starting/stopping the genset for each configuration.

Configuration Shown in FIG. 2 (Configuration 0)

```
If source = inverter
        Start the genset if the inverter is overloaded or if any
loads are disabled and in demand.
        Start the genset if free_amps < current cushion or if
any loads are shed and in demand
If source = shore and genset rating is greater than shore rating then
    Start the genset if shore power is overloaded or if any loads are
    disabled.
    Start the genset if free_amps < current cushion or if any loads are
    shed
If source = genset
    If shore power is available and it can handle the load then turn
    off the genset.
    If shore_amps = 20 or 30 then shut down the genset if
    used_amps + (line2 current*) + cushion < shore_amps
    *Note: Line 2 current is the sum of the current that the
    controlled loads are using that are connected to the second
    output of the genset.
    If there is no shore power available and the inverter can handle
    the non-controlled loads, then turn off the genset.
```

Configuration 1

```
If source = inverter
    Start the genset if the inverter is overloaded or if any loads are
    disabled or any a/c's are shed
        Start the genset if free_ampsL1 < current cushion or if any
        loads are shed
        Start the genset if free_ampsL2 < current cushion or if any
        loads are shed
If source = shore and genset rating is greater than shore rating then
    Start the genset if shore power is overloaded or if any loads are
    disabled and in demand.
        If shore amps = 20 or 30
            Start the genset if free_amps < current cushion or if any
            loads are shed
        If shore amps = 50
            Do not start the genset because maximum genset amps
would equal shore_amps
If source = genset
    If shore power is available and it can handle the load then turn off
    the genset.
        If shore_amps = 20 or 30 then shut down the genset if:
            used_amps + current cushion < shore_amps and no loads
            are shed
        If shore_amps = 50 then shut down the genset if:
            used_ampsL1 + current cushion <
            shore_amps and used_ampsL2 + current
            cushion < shore_amps and no loads are shed
    If there is no shore power available and the inverter can handle
    the loads, then turn off the genset.
```

```
-continued

If shore_amps = 0 then shut down the genset if:
            used_ampsL1 + cushion < inverter_amps and
            used_ampsL2 + cushion < inverter_amps and there
            is no load demand and no controlled loads are running.
```

Auto Start Disable

When the user enables AGS they can select how many days to enable it for. After the enable time has passed, AGS is disabled.

Figure 8:
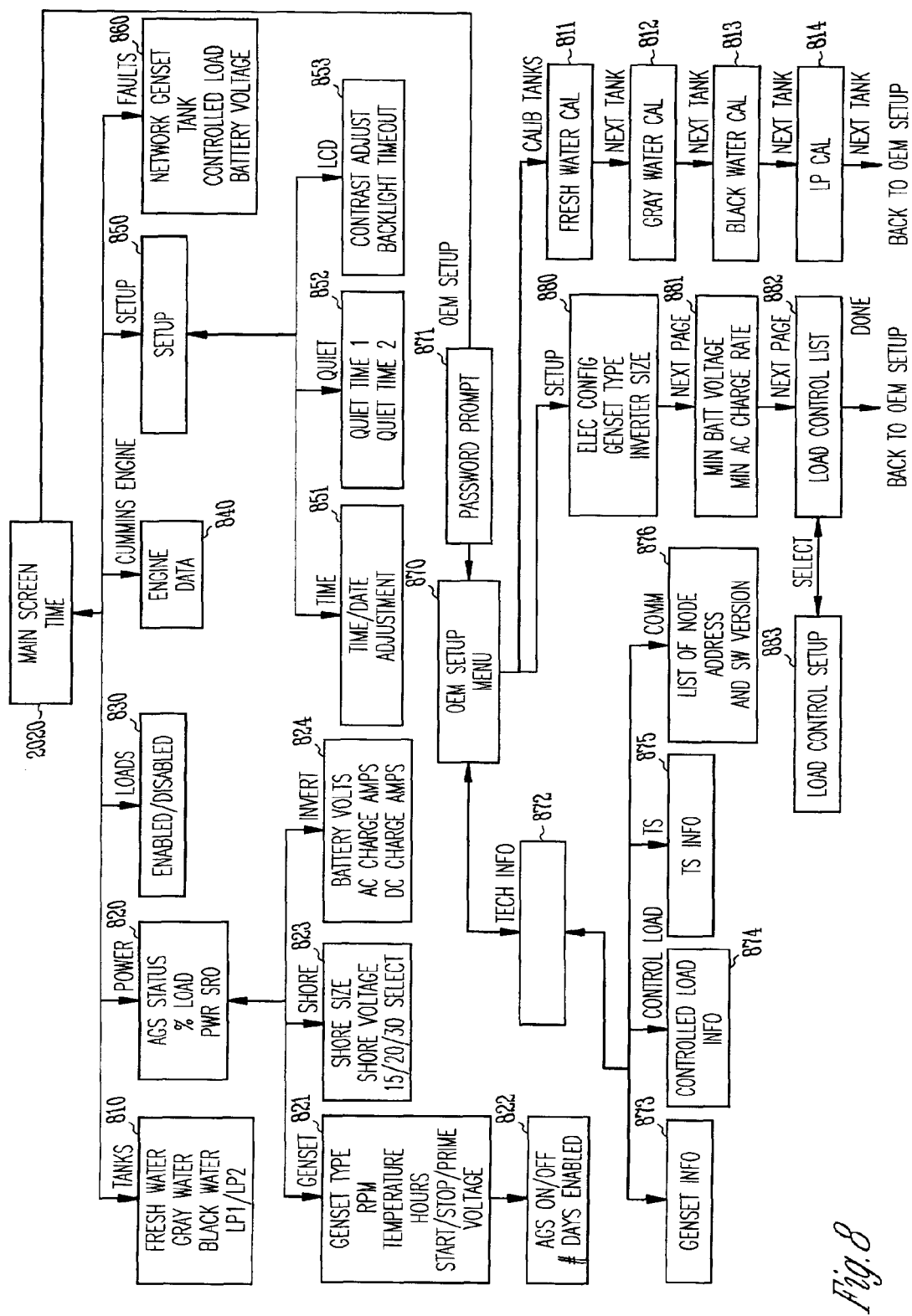
FIG. 8 is a flow chart of the various screens of the display.

The computer 2000 also monitors various aspects of the coach or RV 100. FIG. 8 is a flow chart of the various screens of the display 2020 which are monitored or shown by the computer 2000. The first thing that is monitored are the various tanks associated with the recreational vehicle or coach 100. The computer system monitors and displays the level of the fresh water tank 140, the gray water tank 142, the black water tank 144, and the LP gas tank 146. The tank monitoring function is depicted by reference numeral 810. Various aspects of power are also monitored and displayed as depicted by reference numeral 820. The automatic motor generator start status, the percentage of load, the power source, and time are monitored, as shown in the box referenced 820. The genset type, RPM, temperature, hours, start/stop prime, and voltage of the genset 210, 310 are also monitored, as depicted by reference numeral 821. Also monitored is whether the automatic motor generator start is on or off and the number of days that the motor generator has been enabled, as depicted by reference numeral 822. The shore power is also monitored for display. The size of the shore power, the shore voltage, and the 15/20/30 select are displayed, as shown by reference numeral 823. The information with respect to the inverter that is gathered and displayed is the battery voltage, the AC charge amps, and the DC charge amps, as depicted by reference numeral 824. The various loads and whether or not they are enabled or disabled is also displayed, as depicted by reference numeral 830. Engine data is also displayed, as depicted by reference numeral 840. User information such as fuel economy, engine temperature, coolant temperature, oil temperature, engine load, trip information, and any active faults are stored in memory for display on the display 2020 of the computer 2000. There is also a setup portion of the display, as depicted by reference numeral 850. The setup includes time and date adjustment, as represented by reference numeral 851, and two quiet times, as depicted by reference numeral 852. The display can also be adjusted for contrast and backlight timeout, as depicted by reference numeral 853. The computer 2000 also stores network faults, motor generator set faults, tank status, battery voltage status and controlled load faults or diagnostics for display, as depicted by reference numeral 860. There is also an OEM or original equipment manufacturer setup menu, as depicted by reference numeral 870. This particular display is password protected, as depicted by reference 871, so that the user is unable to get to the OEM setup menu. The OEM setup menu includes tech info 872, genset info 873, controlled load info 874, TS info 875, and communications info including a list of node addresses and the software version, as indicated by reference numeral 876. The OEM setup menu also includes an electrical configuration and genset type, an inverter size, as depicted by reference numeral 880. The OEM setup also includes minimum battery voltage and minimum AC charge rate for recharging of batteries after they have been depleted or an indication of how far these batteries can be depleted before they must be recharged. This is shown by a box having a reference numeral 881. The OEM setup also includes a load control list 882 and a load control setup 883. Finally, the OEM setup allows for calibration of the various tanks including calibration of the fresh water tank 811, calibration of the gray water tank 812, calibration of the black water tank 813, and calibration of the LP tank 814. Coach diagnostics and faults 860 include one of a plurality of motor generator fault which may be displayed. The types of motor generator faults are shown in the following table.

GENERATOR FAULT CODES

| Fault Code | Fault Name | Fault Code | Fault Name |
| --- | --- | --- | --- |
| 1 | High engine temp | 31 | Over speed |
| 2 | Low oil pressure | 32 | Starter fault |
| 3 | Service Check | 33 | High engine temp |
| 4 | Over crank | 34 | Inverter over temp |
| 5 | Air cleaner dirty | 35 | EE Checksum fault |
| 6 | N/A | 36 | Mechanical fault |
| 7 | Sea Water Pres Low | 37 | Invalid set config |
| 8 | Low coolant level | 38 | Field Overload |
| 9 | N/A | 39 | Low Battery Voltage |
| 10 | N/A | 40 | N/A |
| 11 | Inverter(Short Ckt) | 41 | Field Flash Fault |
| 12 | Over voltage | 42 | ROM Checksum fault |
| 13 | Under voltage | 43 | RAM Failure |
| 14 | Over frequency | 44 | N/A |
| 15 | Under frequency | 45 | Speed Sense Lost |
| 16 | Inverter assembly | 46 | N/A |
| 17 | Fuel Pump fault | 47 | Loss of ignition |
| 18 | Glow plug fault | 48 | Loss of Field sense |
| 19 | Actuator fault | 49 | Generator Failure |
| 20 | N/A | 50 | N/A |
| 21 | Start Solenoid | 51 | Processor A/D read |
| 22 | Actuator overload | 52 | Open/Short Injector |
| 23 | Oil pressure switch | 53 | Eng Blk Temp Sensor |
| 24 | Temperature sender | 54 | Mat Sensor fault |
| 25 | Gen over voltage | 55 | N/A |
| 26 | Gen under voltage | 56 | MAP sensor fault |
| 27 | Loss of AC sense | 57 | Fuel System Fault |
| 28 | Quad sense lost | 58 | High Exhaust Temp |
| 29 | High batt voltage | 59 | Low Coolant Level |
| 30 | N/A | 60 | N/A |
|  |  | 61 | Emergency Shutdown |

The coach diagnostics and faults also have tank level senders which display fault or let the user know when a tank level is out of the range of normal operation. When the tank is outside the range of normal operation, a tank level sender fault is displayed. When the fresh water tank 140 or the LP tank 146 is getting low, a low tank warning will be displayed. Likewise, when one of the waste water tanks 142, 144 is getting full, a full tank warning is displayed.

If a control load is drawing more current than was programmed in during setup, a high-current warning will be displayed for that particular load. For example, if an air conditioner is pulling more amps or more current than it is supposed to, generally it depicts that something may be wrong with that particular air conditioner. Other controlled loads such as the refrigerator, stove, heating unit, microwave, and engine block heater can also have similar faults displayed should the loads become too great since this is an indication that something may be wrong such as imminent failure of that particular device.

When a battery voltage is below normal, a battery fault is displayed, and when any node in the network stops communicating the screen displays a network fault and indicates which of the nodes is not functioning.

Figure 9:
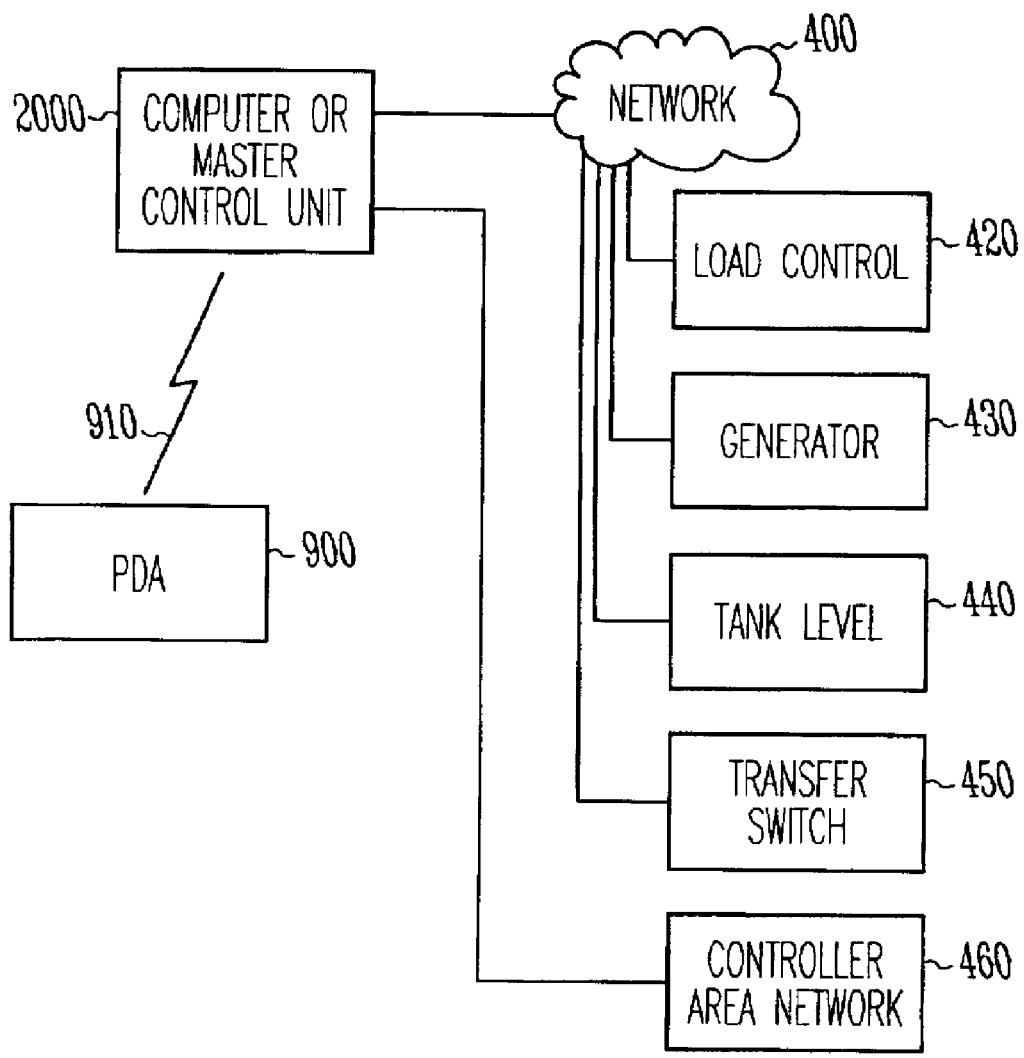
FIG. 9 is a schematic view showing a radio link between the control system and a personal hand held computing device.

FIG. 9 is a schematic view showing a radio link between the computer system 2000 and another device with an RF link such as a remote RF computer device, a personal data assistant, or PDA 900. The network 400 and its nodes 410, 420, 430, 440, 450, and 460 can also be displayed on a PDA 900. The PDA is then capable of being taken outside the coach or recreational vehicle or to different parts of the recreational vehicle or coach when the coach is to be serviced. The PDA 900 and the computer 2000 are linked by radio link 910 or other wireless links such as infrared or sound.

Figure 10:
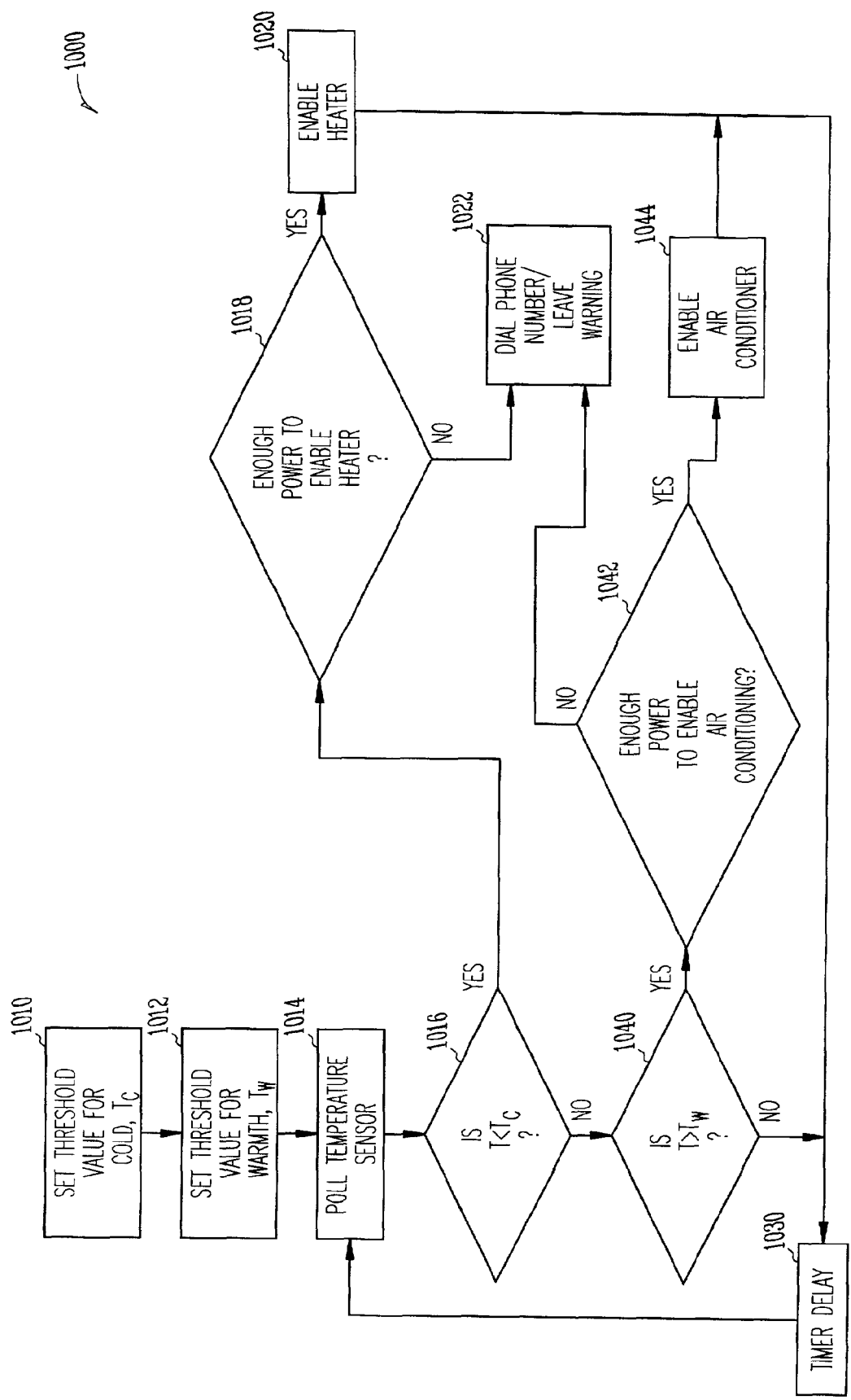
FIG. 10 is a flow chart showing a dial up feature of the present invention.

FIG. 10 is a flow chart 1000 which shows a dialup feature of the present invention. As mentioned previously, the computer system 2000 includes a modem 2022 which can be used to dial a predetermined phone number or ISP to send a warning message to a user. FIG. 10 shows a flow chart that uses such a dialup feature. First of all, the temperature is monitored using the temperature sensor 124 within the living space 102 of the coach 100. The threshold value for cold, $T_C$, is first set, as depicted by reference numeral 1010. A corresponding threshold value for warmth, $T_W$, is also set, as depicted by reference numeral 1012. The temperature sensor is polled, as depicted by reference numeral 1014. If the temperature is less than the temperature for cold, $T_C$, as depicted by decision box 1016, then another decision box is encountered to determine if there is enough power to enable a heater, as depicted by 1018. If there is enough power to enable a heater, then the heater is enabled, as depicted by reference numeral 1020. If there is not enough power to enable the heater, then a number is dialed leaving a warning, as depicted by reference numeral 1022. The warning would indicate that the temperature within the living space 102 of the coach 100 is becoming cold. This might be of interest if the owner has a pet within the RV or coach 100. Similarly, if T is not less than $T_C$, then another decision tree is encountered to determine if the temperature is greater than the warmest temperature allowable, $T_W$, as depicted by reference numeral 1040. If the temperature inside the coach is greater than the warm threshold, then another decision tree is encountered to determine if there is enough power to enable the air conditioning equipment, as depicted by reference numeral 1042. If there is not enough power, then, again, the computer system dials a phone number and leaves a warning, as depicted by box 1022. If there is enough power to enable the air conditioning unit, then the air conditioner is enabled, as depicted by reference numeral 1044. In each case, a delay timer is encountered before the temperature sensor is polled again, as depicted by reference numeral 1014.

Figure 11:
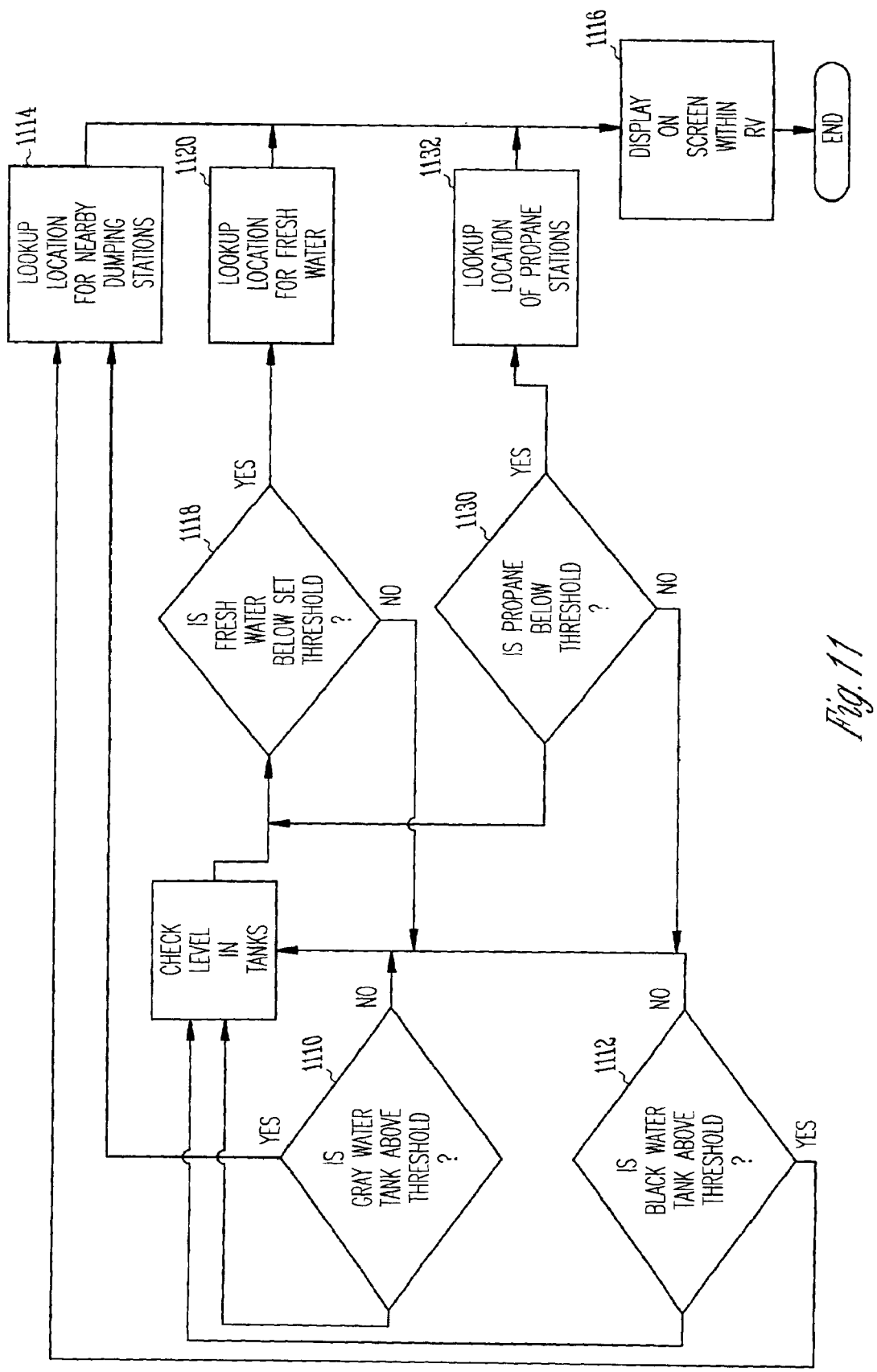
FIG. 11 is a flow chart of another feature in accordance with another embodiment of the invention (tanks full).

FIG. 11 is a flow chart of another feature in accordance with another embodiment of the invention where the tanks are fill. There is information aboard the coach to determine whether or not the gray water tank 142 and the black water tank 144 are above certain thresholds. Each threshold is typically a certain percentage of the full tank. The gray water tank threshold determination is depicted by reference numeral 1110, and the black water tank threshold is determined at decision box 1112. If the gray water tank and the black water tank are above a certain threshold, then a table lookup for nearby dumping stations is referred to, as depicted by reference numeral 1114. Once the nearby dumping stations have been found, they are displayed on the touch screen 2020 located within the RV or coach 100, as depicted by reference numeral 1116. The fresh water tank 140 is also checked to determine if it is below a certain threshold. If it is below a certain threshold, then a lookup table is referred to for fresh water, as depicted by reference numeral 1120. Also checked is the level of the propane tank 146 to determine if it is below a certain threshold, as depicted by reference numeral 1130. If it is below a certain threshold, propane stations are looked up on a table, as depicted by reference numeral 1132. Whenever a lookup is found for a close or nearby location of either a fresh water tank or propane station, these are also displayed on the screen within the RV, as depicted by reference numeral 1116.

It should also be noted that a lookup table need not be stored locally on the coach. The lookup table can be stored at a central data van which is accessible via the Internet. In this instance, the system aboard the coach would access a web page or central database to gain the location or locations of nearby propane, and clean water fill up stations or dumping stations for gray water or black water, as needed for steps 1114 or 1132 of FIG. 11.

To determine where the coach or RV 100 is, there are two approaches. First of all, the user can be prompted to enter a location by the computer 2000. The coach or RV can also be equipped with a global positioning system so that the computer can determine exactly where the coach is and select from a list of locations that have similar coordinates in a GPS lookup table.

Figure 12:
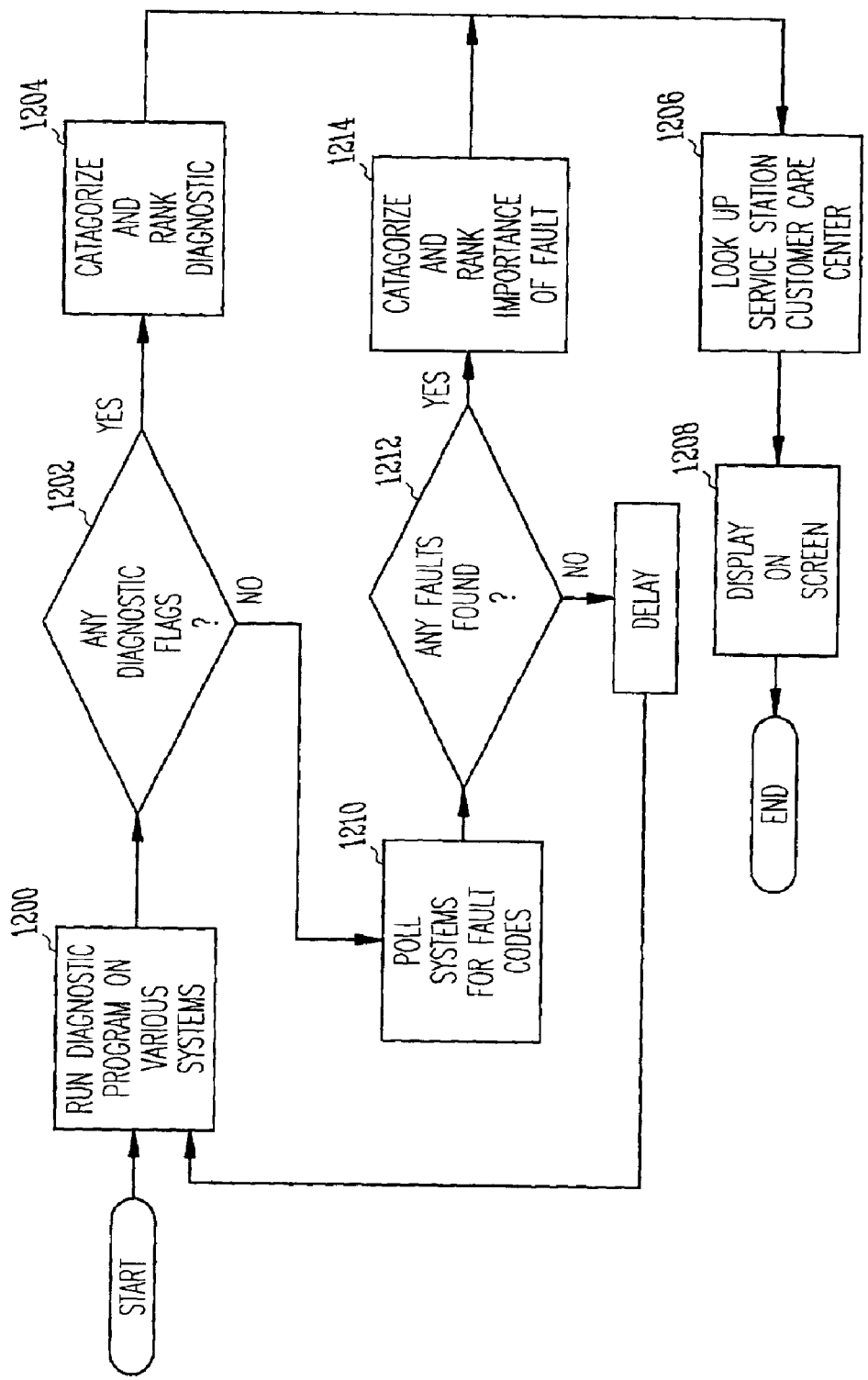
FIG. 12 is a flow chart of another feature in accordance with another embodiment of the invention (service needed).

FIG. 12 is a flow chart of automatically determining if service is needed and determining where that service can be found. Initially, diagnostic tests are run, as depicted by step 1200, and it is determined whether any diagnostic flags have been tripped indicating that there is a problem stored in the diagnostic area, as depicted by reference numeral 1202. If there are any diagnostic flags set, the diagnostic is categorized and ranked in terms of importance to determine if a condition associated with the diagnostic might be catastrophic and needs to be attended to quickly or if a particular diagnostic is something that can be fixed within a certain amount of time, as depicted by reference numeral 1204. Depending upon the rank and the categorization of the diagnostic, the computer 2000 goes to a lookup table to find a customer care center or a service station capable of addressing the problem or problems that might be associated with the particular diagnostic, as depicted by reference numeral 1206. Nearby service stations or customer care centers will be displayed on the display 2020, as depicted by reference numeral 1208. If there are no diagnostic flags found, the system is polled for fault codes, as depicted by reference numeral 1210. If any faults are found, as depicted by decision box 121, then the faults are categorized and ranked in terms of importance, as depicted by reference numeral 1214. Depending upon the rank and importance, the rank and importance of the fault will be displayed as well as a service station or customer care center displayed on 1208 for the particular fault. If no faults are found, a delay takes place and the diagnostic program is run again, as well as polling the system for fault codes. As a result, a user can be going down the road, see a fault and determine whether or not it is a high enough fault where it needs immediate attention. If so, a nearby service station or customer care center can be found and is displayed on the screen. Even if it is not found, it can be logged to be treated at a later date.

Figure 13:
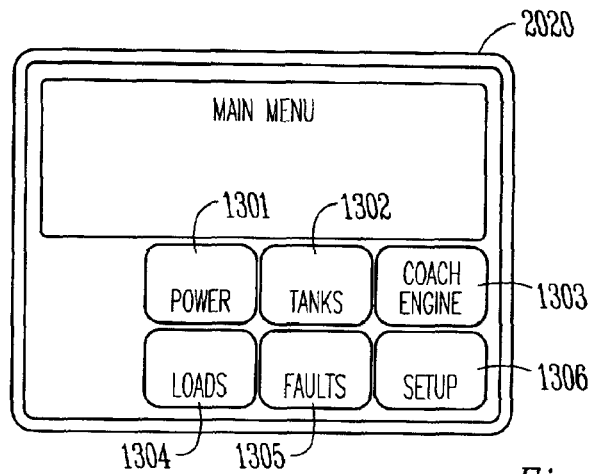
FIG. 13 is a screen display of the main menu.
Figure 14:
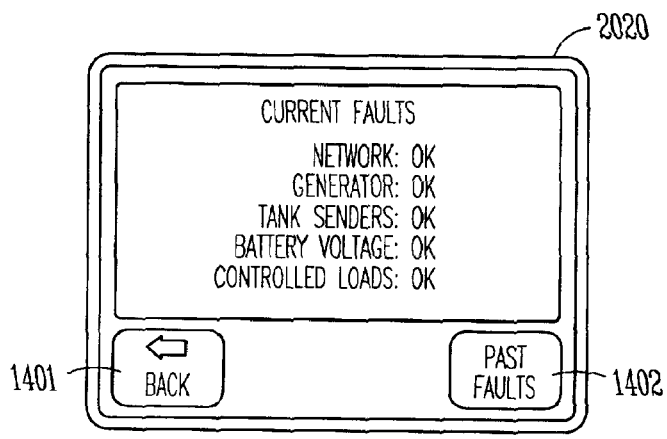
FIG. 14 is a screen display of the current faults menu.
Figure 15:
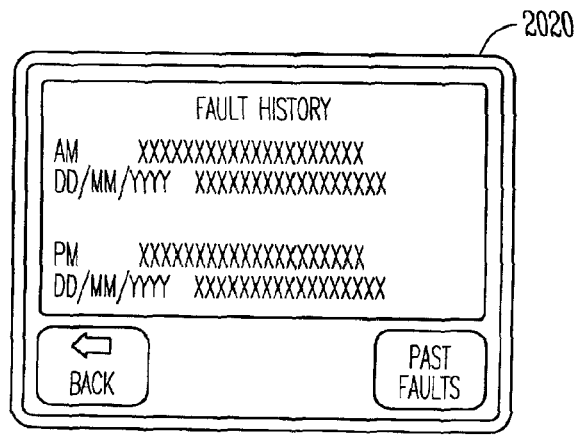
FIG. 15 is a screen display of a fault history menu.

FIGS. 13–15 show the main menu, a current faults menu, and a fault history menu, respectively. The main menu shown in FIG. 13 is a screen shot of the display 2020 of the computer system 200. The main menu is a touch screen that includes information on power as depicted by 1301, on the tanks as depicted by 1302, information on the coach engine is depicted by 1303, information on the loads 1304, information on faults is depicted by reference numeral 1305 and set-up information as depicted by reference numeral 1306. When the faults portion of the main menu is touched a current faults menu, as shown by FIG. 14, is displayed on the display 2020. In this particular instance, there are no current faults for the network, motor generator, tank senders, battery voltage or controlled loads. The current faults menu includes a portion of the screen that is devoted to a back button 1401 as well as a past faults button 1402. By pressing the past faults button 1402, the fault history is displayed. The time, as well as the date, month and year of the occurrence of the fault, as well as a description of the fault, is then displayed as shown in FIG. 15.

Figure 16:
FIG. 16 is a screen display including a pop-up screen.

FIG. 16 shows a screen display when a high-level fault occurs that is important or highly ranked. FIG. 16 shows the main menu on the display 2020 of the computer 2000. The main menu was described in the previous paragraph. When a fault occurs that is highly ranked or deemed serious by the computer system 2000, a pop-up menu 1600 is displayed on the display 2020. Generally, the pop-up menu 1600 occurs on the display 2020 despite what is being currently displayed on the display 2020. In other words, the main menu does not necessarily have to be on display for a pop-up menu 1600 to appear and be shown to the user within the coach 100. It should be noted that a pop-up display 1600 is not always necessary. A current fault could also be displayed as text somewhere upon the screen or display 2020. What is important to note, however, is that when the fault is considered important or deemed to pose a risk to the components of the coach and deemed to also require immediate attention, a pop-up screen or other display means will be used to communicate the fault to the user.

Figure 17:
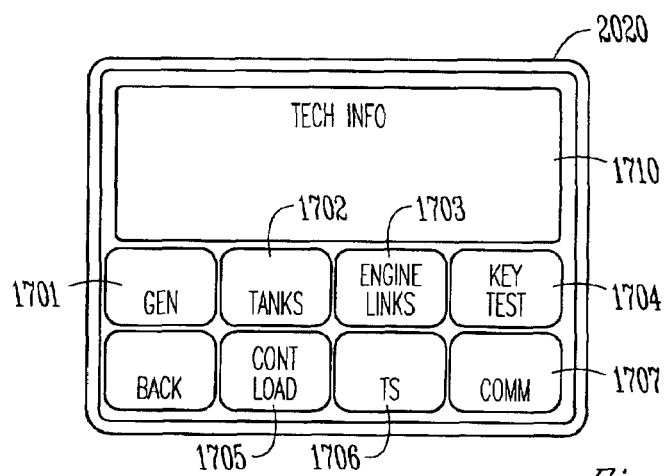
FIG. 17 is a screen display of a technical information menu.
Figure 18:
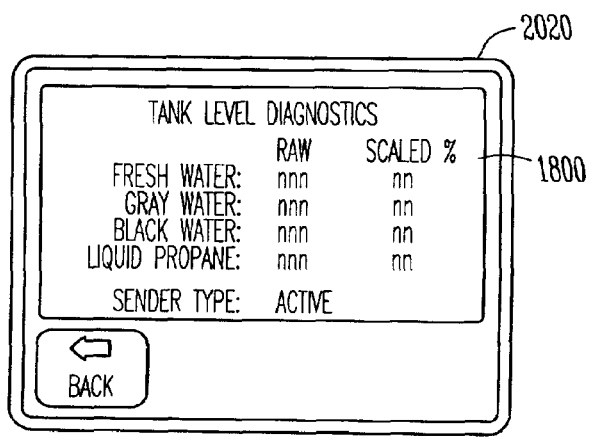
FIG. 18 is a screen display of a tank level diagnostic menu.

FIG. 17 shows that the display 2020 can also include a technical information menu that has information on the motor generators, as depicted by reference numeral 1701, the tanks as depicted by reference numeral 1702, the engine as depicted by reference numeral 1703, the key test as depicted by reference numeral 1704, the controlled load as depicted by reference numeral 1705, the TS as depicted by reference numeral 1706, and the communications as depicted by reference numeral 1707. The technical information menu 1700 also includes a tech information area 1710. Touching the area of the screen relating to the tanks 1702 results in the display switching to a tank level diagnostics menu 1800. The tank level menu diagnostics display 1800 includes a listing of each of the tanks, a raw number and a scaled percentage number. Advantageously, the tank levels are each calibrated at the time of manufacture and the raw number is correlated to a scaled percentage for the fullness of the particular tank. This is much more accurate then other types of tank level displays since it is calibrated when the tank is empty as well as when the tank is full. The tank level display is therefore analog and the user can determine the exact percentage of fuel, gray water, fresh water, black water or liquid propane on board the coach 100. Therefore, at manufacture, there is a linear interpolation and calibration of the tank sensors that provides for better accuracy when the user needs to know the level of the tanks. In addition, the tank sensor circuit is compatible with both active and resistive senders. It should also be noted that the type of sender used in the tanks is also displayed in the tank level diagnostics menu 1800.

Figure 19:
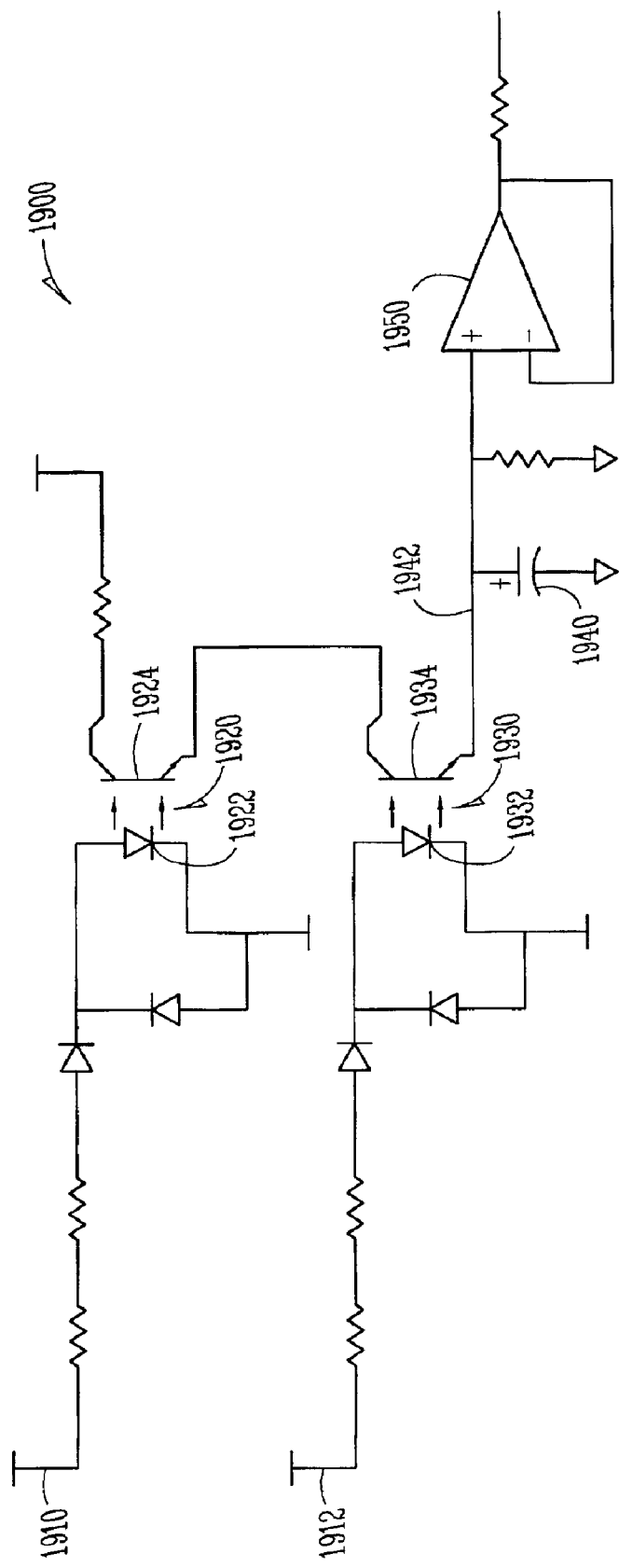
FIG. 19 is a schematic diagram of a 50 amp sense circuit.

FIG. 19 is a schematic diagram of a 50 amp phase sensing circuit 1900. The 50 amp phase sensing circuit 1900 is for determining whether the shore power is single or dual phase. The 50 amp circuit 1900 includes a first input 1910, a second input 1912, a first photo insulator 1920, and a second photo insulator 1930, a low pass filter 1940, and a voltage follower 1950. The photo insulator 1920 is associated with the first input 1910. Photo insulator 1930 is associated with the second input 1912. Each photo insulator includes a light-emitting diode 1922, 1932 and a photo transistor 1924, 1934. Each of the photo insulators 1920 and 1930 are banded together. In other words in order to get an output on or at line 1942, each photo transistor 1924 and 1934 will have to be enabled in order to produce an output at line 1942. In other words, light-emitting diode 1922 must admit light and photons that strike the photo transistor 1924 in order for current to pass through photo transistor 1924 and light-emitting diode 1932 will also have to be transmitting photons that strike the photo transistor 1934 at approximately the same time before a signal is output on line 1942. The signal output on line 1942 includes a series of spikes. The low pass filter 1940 includes a capacitor that levels out the spikes to produce more of a DC current which is input to the voltage follower 1950. Downstream from the voltage follower 1950, there is a resistor 1960 which reduces the voltage and current to a point where the signal out from the resistor 1960 is at an appropriate level for the microprocessor. In other words, the signal output from the resistor 1960 can be directly input to the microprocessor of the computer system 2000.

Advantageously, the present invention provides a control system which is integral so that a repairman or user does not have to go to each separate device to determine if there is a problem. In addition, a main computer gathers data from each of the nodes and electrical devices associated therewith so that decisions can be made with respect to one or more devices attached to a network. The main computer or microprocessor also displays status of the devices as well as decisions needed to be made by the user. For example, quiet times associated with a campground or marina may have to be input so that the main computer or microprocessor associated with recreational vehicle can determine when on board motor generators can be used. The main computer also stores diagnostic codes for use by repair persons and can be used to store locations of service dealers, dumping stations, or other needed service providers for a recreational vehicle. The main computer or microprocessor can also conducts power management from determining the amount of shore power, monitoring the shore power as well as the current draw from the loads associated with the recreational vehicle. The display is user friendly and can include a radio link so that information may be accessed exterior to the living areas of the coach or recreational vehicle.

CONCLUSION

In conclusion, a power control system for a recreational vehicle includes a connector adapted for receiving electrical current from a source of shore power. The connector is for connecting the recreational vehicle to the source of shore power. The power control system also includes a sensor for automatically determining the level of shore power input to the recreational vehicle, and a device for setting an electrical system to use the available amount of shore power when it cannot be sensed. The power control system determines the current rating and characteristics of the shore power by detecting a phase difference between at least two phases of the shore power. The power control system can also detect voltage of various power sources.

In addition, a control system for a plurality of devices in a recreational vehicle includes a network having a first node associated with a first device of the plurality of devices and a second node associated with a second device of the plurality of devices. The control system also includes a microprocessor for running a set of commands to control the first device and the second device. The control system farther includes memory accessible by the microprocessor for storing data associated with the first device and the second device.

One of the first and second nodes is a load control node for controlling loads associated with the recreational vehicle. The load control node can also monitor power demand and, more specifically, can monitor demand from the first device and the second device. The load control is capable of disabling one of the first device or the second device when the power demand exceeds a level of available power. The control node can monitor demand from the first device and the second device. The control system is capable acting through the control node of the control system to reconnect one of the first device or the second device when the power demand is less than the level of available power. The load control node can also monitor demand from the first device and the second device and disable one of the first device or the second device in anticipation of a condition when the power demand will exceed a level of available power. Disabling one of the first device or the second device is based on a prioritization in anticipation of a condition when the power demand exceeds a level of available power. Reconnecting the loads is done on a reverse of the prioritization.

The motor generator or inverter control node of the control system may also start the motor generator 150 when battery 152 power is too low.

The control system can also control a first source of power and a second source of power. The first source of power and the second source of power are associated with the motor generator or inverter control node. The load control node monitors demand from the first device and the second device and can enable the second source of power in anticipation of a condition when the power demand exceeds a level of available power from the first source of power. The second source of power may be a variety of devices such as a battery, a fuel cell, or a motor generator set. When the second source of power is a battery, the microprocessor acting under a set of instructions to monitor the battery level and control the charging and discharging of the battery. The set of instructions for the microprocessor may include a schedule of times during which the motor generator can be enabled. In other words, there may be times when a motor generator set is too noisy and may disturb others, for example, during sleeping hours in a marina or RV park.

The control system for a plurality of devices in a recreational vehicle can include a MCU node, and a display attached to the MCU node. The display is capable of displaying information from the first and second devices. The control system also includes a tank level node adapted to monitor the level of at least one tank associated with the recreational vehicle. The control system further includes an engine node for receiving information from the engine of the recreational vehicle. The information received from the engine includes fault codes associated with the engine. Yet another node associated with the control system is a transfer switch node for receiving information from the first and second devices of the recreational vehicle. The information from the first and second devices includes voltages and currents associated with the first and second devices. The information received from the transfer switch node includes battery voltage from a battery associated with the recreational vehicle. The motor generator 150 is connected to a motor generator node and the inverter is connected to an inverter node. The motor generator node and inverter node provide access to information about the motor generator 150 and inverter 154.

One of the devices of the plurality of devices may include air conditioning or heating equipment. The control system can further include a temperature sensor, and a modem. In response to a temperature in the recreational vehicle being beyond a threshold value, the control system dials a predetermined number. For example, if a recreational vehicle gets too hot and there is not enough power to enable an air conditioner, the control system may be programmed to dial the cell phone number of the owner. The control system could also include a carbon monoxide sensor. The control system will disable a motor generator in response to a carbon monoxide level in the recreational vehicle being above a threshold value.

The control system for a plurality of devices in a recreational vehicle includes memory accessible by the microprocessor. The control system stores fault codes or diagnostic data associated with the first device and the second device in the memory.

A recreational vehicle includes a chassis which includes a living space, an electrical system for providing electrical power to the living space, an air conditioner for cooling the living space, a heater for heating the living space, and a plurality of appliances within the living space attached to the electrical system. The recreational vehicle also includes an engine for moving the recreational vehicle, a motor generator for supplying power to the recreational vehicle, a connector for connecting the electrical system of the recreational vehicle to an external power source, and a local area network system electrically connected to the air conditioner, the heater, the plurality of appliances, and the motor generator. The local area network manages the power provided to the air conditioner, the heater, the plurality of appliances and enables the motor generator when voltage through the connector drops below a threshold level. The recreational vehicle also includes a display positioned within the living space. The display shows data related to the air conditioner, the heater, the plurality of appliances, the motor generator and the engine. The recreational vehicle further includes a plurality of tanks, and a plurality of level sensors for sensing the level in the plurality of tanks.

Preferred embodiments of the present invention are described above. Those skilled in the art will recognize that many embodiments are possible within the scope of the invention. Variations, modifications, and combinations of the various parts and assemblies can certainly be made and still fall within the scope of the invention. Thus, the invention is limited only by the following claims, and equivalents thereto.

What is claimed is:

1. A power control system for a recreational vehicle comprising:
   a connector adapted for receiving electrical current from a source of shore power, the connector for connecting the recreational vehicle to the source of shore power;
   a sensor for automatically determining the amp service level of the shore power input to the recreational vehicle; and
   means for setting an electrical system not to exceed the sensed amp service level of the shore power.

2. The power control system of claim 1 wherein the amp service level of the shore power is determined by a phase difference between at least two phases of the shore power.

3. The power control system of claim 2 further comprising a rechargeable power source wherein the amount of current used to recharge the rechargeable power source is automatically adjusted based on the amount of available shore or generator power.

4. The power control system of claim 3 wherein the rechargeable power source includes a battery.

5. The power control system of claim 3 wherein the rechargeable power source includes a capacitor.

6. The power control system of claim 3 wherein the rechargeable power source includes an inverter.

7. The power control system of claim 1, further comprising means for automatically connecting a generator to the electrical system when an electrical load of the electrical system is higher than the sensed amp service level of the shore power.

8. The power control system of claim 1, wherein the power control system is automatically set to the sensed amp service level.

9. A power control system for a recreational vehicle comprising:
   a connector adapted for receiving electrical current from a source of shore power, the connector for connecting the recreational vehicle to the source of shore power;
   a controller for automatically determining the amp service level of the shore power input to the recreational vehicle and automatically setting an amp limit threshold for an electrical system depending on the sensed amp service level; and
   means for automatically connecting a generator to the electrical system when an electrical load of the electrical system is higher than the sensed amp service level of the shore power.

10. The power control system of claim 9 wherein the amp service level of the shore power is determined by a phase difference between at least two phases of the shore power.

11. The power control system of claim 10 further comprising a rechargeable power source wherein the amount of current used to recharge the rechargeable power source is automatically adjusted based on the amount of available shore power or generator power.

12. The power control system of claim 11 wherein the rechargeable power source includes a battery.

13. The power control system of claim 11 wherein the rechargeable power source includes a capacitor.

\* \* \* \* \*